US011995527B2

(12) United States Patent
Pottier et al.

(10) Patent No.: US 11,995,527 B2
(45) Date of Patent: May 28, 2024

(54) APPARATUS, METHOD AND COMPUTER PROGRAM FOR DEVELOPING A BEHAVIOUR TOOL TO ESTIMATE A BEHAVIOUR OF A PERSON

(71) Applicant: Arm Limited, Cambridge (GB)

(72) Inventors: Remy Pottier, Grenoble (FR); Minsheng Lu, Cambridge (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 17/988,099

(22) Filed: Nov. 16, 2022

(65) Prior Publication Data
US 2023/0306232 A1    Sep. 28, 2023

Related U.S. Application Data

(63) Continuation-in-part of application No. 17/669,851, filed on Feb. 11, 2022.

(51) Int. Cl.
*G06V 40/20*    (2022.01)
*G06N 3/004*    (2023.01)

(52) U.S. Cl.
CPC ............. *G06N 3/004* (2013.01); *G06V 40/20* (2022.01)

(58) Field of Classification Search
None
See application file for complete search history.

(56) References Cited

U.S. PATENT DOCUMENTS 8,621,242 B2    12/2013  Brown
9,196,125 B2 *  11/2015  De Viveiros Ortiz ......................
                                                  G07F 17/3267

(Continued)

FOREIGN PATENT DOCUMENTS

WO    2019/175569    9/2019

OTHER PUBLICATIONS

Notice of Allowance dated Dec. 20, 2023 for U.S. Appl. No. 17/669,851, 8 pages.

(Continued)

*Primary Examiner* — Kim T Nguyen
(74) *Attorney, Agent, or Firm* — NIXON & VANDERHYE P.C.

(57) ABSTRACT

A computer implemented technique for developing a behaviour tool to estimate a behaviour of a particular person in response to a given situation, comprises maintaining, in a storage device, digital memories and a record of associations between the digital memories, where a given digital memory is generated in response to a given event associated with the particular person and is determined from analysis of multiple items of data associated with the given event, including at least items of personal data derived from signals gathered from a plurality of sensors used to monitor the particular person. Processing circuitry is then employed to analyse the digital memories and the record of associations between the digital memories, in order to generate a digital twin of the particular person comprising one or more personalised cognitive models, each personalised cognitive model being arranged to emulate an associated cognitive skill of the particular person. At least one of the one or more personalised cognitive models forming the digital twin is then output for incorporation within the behaviour tool so as to cause the estimated behaviour of the particular person in response to the given situation to be influenced, at least in part, by model output data generated by the at least one of the one or more personalised cognitive models.

20 Claims, 13 Drawing Sheets

(56) References Cited

U.S. PATENT DOCUMENTS

| | | | |
|---|---|---|---|
| 11,657,100 B2 | 5/2023 | Misra | |
| 2012/0115581 A1* | 5/2012 | Englman | G07F 17/34 |
| | | | 463/25 |
| 2013/0324222 A1* | 12/2013 | De Viveiros Ortiz | |
| | | | G07F 17/3267 |
| | | | 463/25 |
| 2018/0032691 A1 | 2/2018 | Zur | |
| 2018/0300510 A1 | 10/2018 | Lam | |
| 2020/0143943 A1 | 5/2020 | Nelson | |
| 2021/0223864 A1 | 7/2021 | Forsland | |
| 2022/0138256 A1 | 5/2022 | Misra | |
| 2023/0177971 A1* | 6/2023 | Mowery | G09B 19/02 |
| | | | 434/350 |
| 2023/0218214 A1* | 7/2023 | Alford | G06F 16/2477 |
| | | | 434/236 |
| 2023/0259560 A1* | 8/2023 | Pottier | G06F 16/908 |
| | | | 707/705 |
| 2023/0281336 A1* | 9/2023 | Pottier | G06F 21/6245 |
| | | | 726/26 |
| 2023/0306232 A1* | 9/2023 | Pottier | G06N 20/00 |

OTHER PUBLICATIONS

Office Action dated Aug. 30, 2023 for U.S. Appl. No. 17/669,851, 23 pages.

U.S. Appl. No. 17/669,851, filed Feb. 11, 2022, Pottier et al.

Webpage: Wikipedia, "Content-aware pervasive systems", downloaded/printed Jan. 31, 2022, 3 pp, at URL: https://en.wikipedia.org/wiki/Context-aware_pervasive_systems.

Webpage: Javatpoint, "Types of AI Agents", downloaded/printed Jan. 13, 2022, 6 pp., at URL: https://javatpoint.com/types-of-ai-agents.

Karen Henricksen, et al., "Developing Content-Aware Pervasive Computing Applications: Models and Approach", in ScienceDirect, Pervasive and Mobile Computing, vol. 2, Issue 1, Feb. 2006, 32 pp.

Flavia Sofia Acerbo et al, "Safe Imitation Learning on Real-Life Highway Data for Human-like Autonomous Driving" 24th IEEE International Conference on Intelligent Transportation Systems—ITSC2021, Sep. 19-22, 2021, (Downloaded from https://arxiv.org/abs/2110.04052_on_7_November_2022), 6 pages.

Tom Le Paine et al, "One-Shot High-Fidelity Imitation: Training Large-Scale Deep Nets With RL" Oct. 2018, (Downloaded from https://arxiv.org/abs/1810.05017 on Nov. 7, 2022), 17 pages.

* cited by examiner

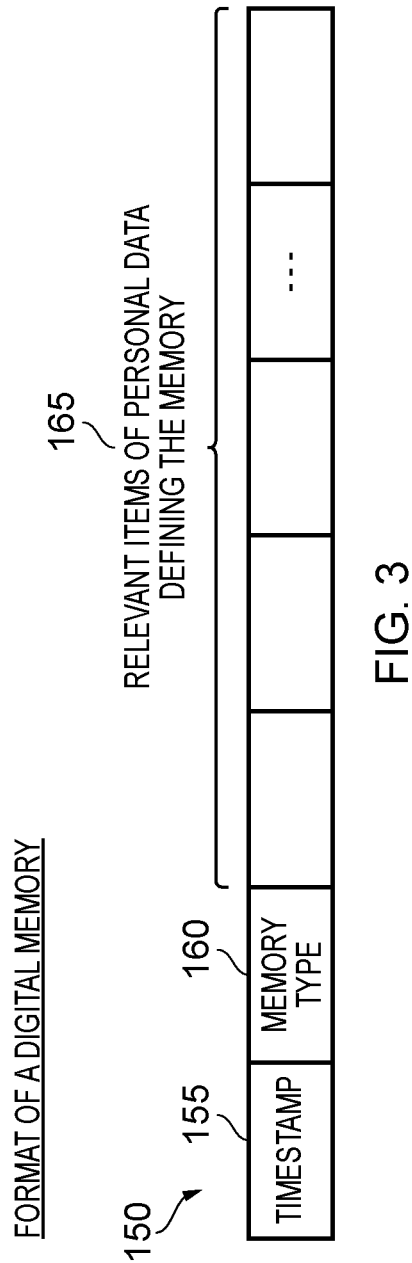

APPARATUS, METHOD AND COMPUTER PROGRAM FOR DEVELOPING A BEHAVIOUR TOOL TO ESTIMATE A BEHAVIOUR OF A PERSON

CROSS-REFERENCE TO RELATED APPLICATIONS

This application is a continuation-in-part of U.S. application Ser. No. 17/669,851 filed Feb. 11, 2022, the entire contents of which are hereby incorporated by reference.

BACKGROUND

The present technique relates to an apparatus, method and computer program for developing a behaviour tool to estimate a behaviour of a person.

Such a behaviour tool could take a wide variety of different forms, and the exact form used may depend on the type of behaviour that is seeking to be estimated and/or the manner in which the behaviour tool will be used. Purely by way of example, such a behaviour tool could take the form of a companion robot that can be used to undertake certain tasks on behalf of a person, and/or to interact with the person to assist that person in daily life.

However, the usefulness of such a behaviour tool will depend on how reliably it can estimate a behaviour of the person that it is provided for, and hence it would be desirable to provide a technique that facilitates efficient training of such a behaviour tool in a manner that enables the behaviour tool to provide a reliable estimation of the behaviour of the person.

SUMMARY

In a first example implementation, there is provided a computer implemented method of developing a behaviour tool to estimate a behaviour of a particular person in response to a given situation, comprising maintaining, in a storage device, digital memories and a record of associations between the digital memories, where a given digital memory is generated in response to a given event associated with the particular person and is determined from analysis of multiple items of data associated with the given event, including at least items of personal data derived from signals gathered from a plurality of sensors used to monitor the particular person; employing processing circuitry to analyse the digital memories and the record of associations between the digital memories, in order to generate a digital twin of the particular person comprising one or more personalised cognitive models, each personalised cognitive model being arranged to emulate an associated cognitive skill of the particular person; and outputting at least one of the one or more personalised cognitive models forming the digital twin for incorporation within the behaviour tool so as to cause the estimated behaviour of the particular person in response to the given situation to be influenced, at least in part, by model output data generated by the at least one of the one or more personalised cognitive models.

In a second example implementation, there is provided a computer program comprising program instructions which, when executed on a computer, cause the computer to implement a method in accordance with the first example implementation. The computer program may be provided in a transitory or non-transitory form, and in one example implementation a computer-readable storage medium is provided that stores the computer program thereon. In accordance with the second example implementation, the functionality discussed herein in association with various circuit elements may be performed by software executing on one or more processing devices (e.g. a central processing unit) of a computer.

In a third example arrangement, there is provided an apparatus comprising: a storage device configured to store digital memories and a record of associations between the digital memories, where a given digital memory is generated in response to a given event associated with a particular person and is determined from analysis of multiple items of data associated with the given event, including at least items of personal data derived from signals gathered from a plurality of sensors used to monitor the particular person; processing circuitry to analyse the digital memories and the record of associations between the digital memories, in order to generate a digital twin of the particular person comprising one or more personalised cognitive models, each personalised cognitive model being arranged to emulate an associated cognitive skill of the particular person; and digital twin storage to store the generated digital twin, for provision of at least one of the one or more personalised cognitive models forming the digital twin to a behaviour tool used to estimate a behaviour of the particular person in response to a given situation, so as to cause the estimated behaviour of the particular person in response to the given situation to be influenced, at least in part, by model output data generated by the at least one of the one or more personalised cognitive models.

In a still further example arrangement, there is provided an apparatus providing a behaviour tool to estimate the behaviour of a particular person in response to a given situation, comprising: storage to store at least one of one or more personalised cognitive models forming a digital twin of the particular person, each personalised cognitive model being arranged to emulate an associated cognitive skill of the particular person; one or more sensors to generate input data indicative of an environment in which the behaviour tool is placed; input data processing circuitry to process the input data in order to generate metadata indicative of the given situation, and to input at least a portion of the metadata to the at least one of the one or more personalised cognitive models forming the digital twin in order to generate model output data; and decision circuitry to estimate the behaviour of the particular person in response to the given situation in dependence on both the metadata and the model output data.

BRIEF DESCRIPTION OF THE DRAWINGS

The present technique will be described further, by way of illustration only, with reference to examples thereof as illustrated in the accompanying drawings, in which:

FIG. 3 schematically illustrates the format of a digital memory in accordance with one example implementation;

DESCRIPTION OF EXAMPLES

Figure 1:
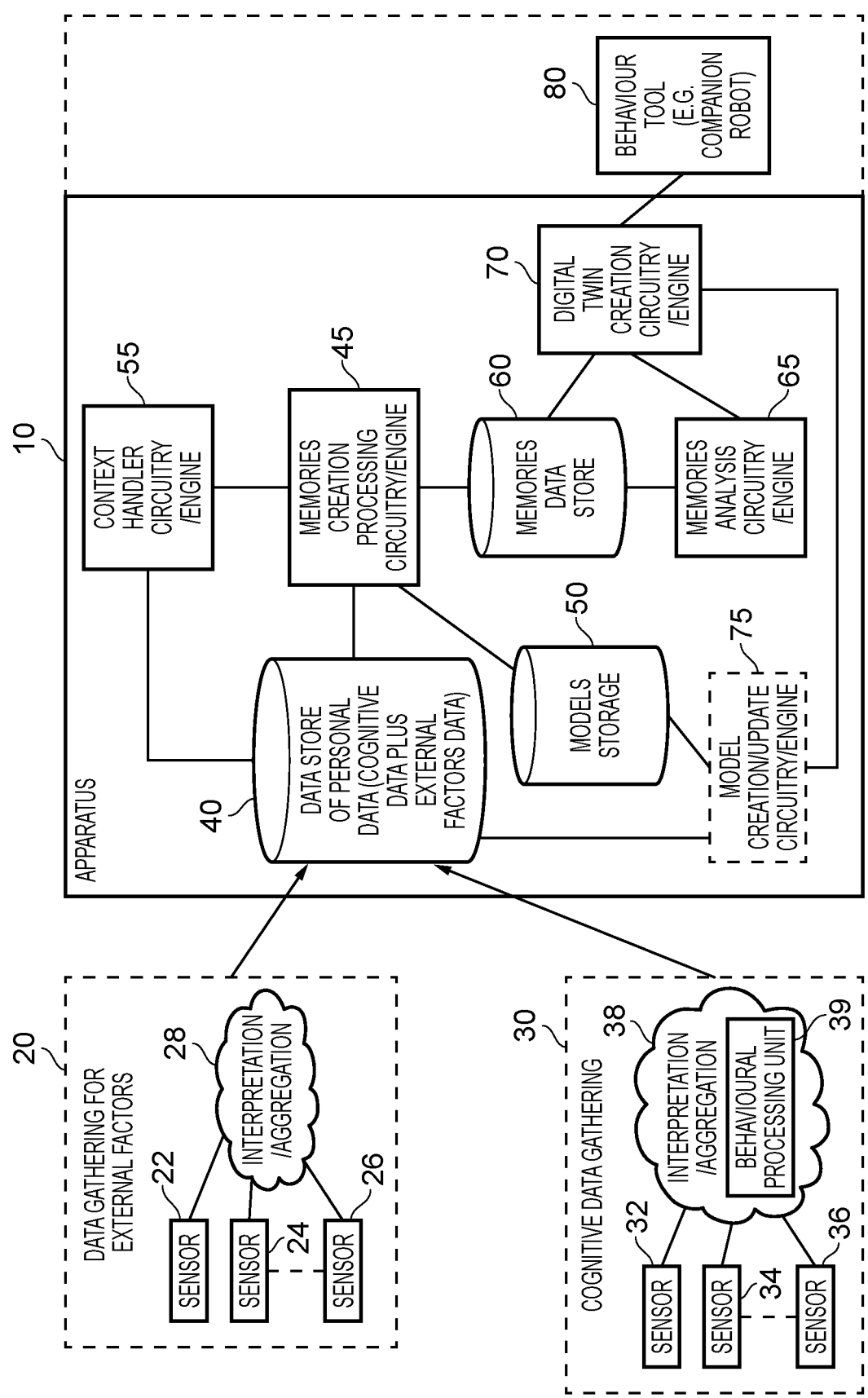
FIG. 1 is a block diagram of an example of a system in which the techniques described herein may be utilised.

In accordance with the techniques described herein, a computer implemented method is described for developing a behaviour tool to estimate a behaviour of a particular person in response to a given situation. The behaviour tool can take a variety of forms, but in one example implementation may take the form of a companion robot for use by the particular person to assist them in their daily life. This assistance can take a wide variety of different forms. It may involve, for example, performing certain tasks on behalf of the particular person, providing information or suggestions to assist the particular person in performing such a task, analysing information on behalf of the particular person and providing attention prompts in relation to matters that are considered to be of interest to the particular person, or may require an action to be undertaken by the particular person, etc.

In accordance with the techniques described herein, the computer implemented method comprises maintaining, in a storage device, digital memories and a record of associations between the digital memories, where a given digital memory is generated in response to a given event associated with the particular person, and is determined from analysis of multiple items of data associated with the given event, including at least items of personal data derived from signals gathered from a plurality of sensors used to monitor the particular person. Processing circuitry (which may be a dedicated hardware circuit, or may take the form of general purpose processing circuitry operating under software control) is then employed to analyse the digital memories and the record of associations between the digital memories, in order to generate a digital twin of the particular person comprising one or more personalised cognitive models, each personalised cognitive model being arranged to emulate an associated cognitive skill of the particular person. Further, at least one of the one or more personalised cognitive models forming the digital twin is then output for incorporation within the behaviour tool so as to cause the estimated behaviour of the particular person in response to the given situation to be influenced, at least in part, by model output data generated by the at least one of the one or more personalised cognitive models.

Exactly which personalised cognitive models forming the digital twin are used within the behaviour tool may vary dependent on implementation. For example, every personalised cognitive model forming the digital twin could be output for incorporation within the behaviour tool, or alternatively it may be determined for any given behaviour tool that only a subset of the personalised cognitive models will be used by that behaviour tool, and accordingly that subset can be output to the behaviour tool. As a yet further alternative, artificial intelligence (AI) techniques such as machine learning techniques employed within the behaviour tool may decide which personalised cognitive model or models to use in any given scenario (for example based on inputs received by the tool indicative of the given scenario), with the required cognitive models either being retrieved into the behaviour tool as and when required, or with all the cognitive models forming the digital twin being stored within the behaviour tool upfront, and with different ones, or combinations, of those cognitive models being selected for use as and when required.

It has been found that by creating a database of digital memories, and associations between those digital memories, this can facilitate a generic and scalable mechanism for modelling an individual. In particular, based on the stored digital memories, and the determined associations between those memories, a high fidelity digital twin of the person can be developed that is able to infer human behaviour, emotion, etc., based on the generated digital memories and associations between those memories. This high fidelity digital twin can then evolve over time, as further digital memories and associations between memories are generated. By such an approach, a wide variety of different cognitive skills can be developed, which can then be used to assist the individual in various settings.

In accordance with the techniques described herein, the digital twin created from such digital memories and their associations can be arranged to comprise one or more personalised cognitive models, and all or some of those personalised cognitive models can then be incorporated within the behaviour tool. It has been found that such an approach provides a very efficient mechanism for training the behaviour tool, in a way that better enables the behaviour tool to estimate the behaviour of the person being modelled. For example, by such an approach, it is possible for the behaviour tool to more reliably make an educated decision as to the expected behaviour of the person in various situations. For instance, it has been found that such personalised cognitive models generated from the digital memories can produce information such as context and/or causality information, and in some example implementations this information can be used to supplement other information available to the behaviour tool, in order to allow more reliable and accurate estimations of the person's behaviour to be made.

The approach described herein gives significant benefits relative to known techniques. For instance, it has up to now been considered very difficult to train robots (for example humanoid robots or droids) to reproduce what may be mundane tasks for a human. One of the reasons for this is that humans can perform reasoning about unobservable factors (factors not represented by pixels or sensor data), and this has been difficult to replicate in existing robot design. However, due to the use of the personalised cognitive models of the digital twin described herein, such reasoning can be replicated within the behaviour tool. Hence, the present technology can enable a machine to intelligently and efficiently learn human reasoning and decision-making, which can enable a behaviour tool to be developed (whether as a humanoid robot, droid or any other suitable machine) to intelligently and efficiently not just mimic but act on a person's behalf in context. This approach will hence enable machines to be created that can behave in a more human-like manner, for a variety of purposes, for example training, education, acting as a home assistant, etc.

The manner in which the processing circuitry is arranged to generate the one or more personalised cognitive models forming the digital twin may vary dependent on implementation. However, by way of example, in one implementation the processing circuitry may be arranged to perform a pattern analysis process to search for patterns in the stored digital memories and the associations between the digital memories, when developing the one or more personalised cognitive models used to form the digital twin. Machine learning techniques such as deep learning may be used as part of this process, and/or the process may be guided by the particular person in order to improve fidelity.

In one example implementation, the analysis performed by the processing circuitry when developing the one or more personalised cognitive models used to form the digital twin may be arranged to take into account a context in which the behaviour tool will be used to estimate the behaviour of the particular person. Hence, in accordance with such an approach, the intended end use case for the behaviour tool may be taken into account when developing the cognitive models forming the digital twin. In one example implementation, different base models may be provided from which the personalised cognitive models can be developed using the store of digital memories and associations between those memories, and which base model or base models are used may be dependent on the context in which the behaviour tool will be used. The way in which the digital memories and their associations are analysed may vary dependent on the base model used. For example, the relative importance given to certain digital memories by any given base model may vary dependent on the type of digital memory, as may the associations between memories. The memory type can take a variety of forms, and could for example represent a type of emotion such as happy or sad, an inner quality like sensibility which is an indication of capacity for responding to emotions, a cognitive skill such as perception, judgement or executive functioning—which is a person's capability of planning, organising tasks, etc.

In one example implementation, the information generated by the behaviour tool using one or more of the personalised cognitive models can be used to supplement other information that may be available to the behaviour tool. For example, the computer implemented method may further comprise receiving, from one or more sensors associated with the behaviour tool, input data indicative of an environment in which the behaviour tool is placed, and employing input data processing circuitry to process the input data in order to generate metadata indicative of the given situation. Then, at least a portion of the metadata may be input to the at least one of the one or more personalised cognitive models forming the digital twin in order to generate model output data. Thereafter, decision circuitry may be employed to estimate the behaviour of the particular person in response to the given situation in dependence on both the metadata and the model output data.

The earlier-mentioned input data processing circuitry and decision circuitry may be dedicated hardware components, or may take the form of general purpose processing circuitry operating under software control to perform the required functions. The circuitry could be provided within the behaviour tool (for example as components within a companion robot), or could be provided externally to the behaviour tool, and referenced by the behaviour tool as required.

The one or more sensors mentioned above could take a variety of forms, but in one example implementation comprise at least an imaging device to obtain one or more image signals of the environment in which the behaviour tool is placed, and the input data processing circuitry may then be arranged to perform a scene graph generation operation to analyse the one or more image signals in order to generate associated metadata indicative of the given situation. In such an implementation, the model output data used by the decision circuitry can be arranged to provide at least one of context information and causality information used to augment the metadata generated by the input data processing circuitry.

In particular, it has been found that the model output data can provide information that cannot be deduced directly by the scene graph generation operation, for example relating to unobservable factors not directly deducible from the image data used in the scene graph generation operation. Since the model output data is generated from one or more personalised cognitive models that have been determined from analysis of digital memories generated in response to events associated with the particular person, and the associations between those memories, that model output data can provide context information and/or causality information that can supplement other information available to the behaviour tool. Such information can for example provide an indication of the relationship between objects and the particular person in a certain setting, which can then be used in assessing an expected behaviour of the person in that scenario. By way of specific example, whilst it may be possible from the image data to determine that there is a fire, the image analysis itself may not enable a determination as to whether the fire is problematic (for example a pan on a cooking hob has burst into flames), or something that is not problematic (for example a controlled bonfire within the person's garden), and will not indicate an appropriate response. However, the use of the model output data by the behaviour tool can help to distinguish between these scenarios, and to decide on an appropriate response.

Such model output data may give an indication of how the user should react in a particular context, for example in a fire situation that is considered to be problematic it may identify an appropriate response (for instance in one scenario it may indicate that water should be used to extinguish the fire, whilst in another scenario it may indicate that carbon dioxide should be used). It may be possible using the model output data to infer causality based on context, or there may be an enforced causality, for example by application of a specific formal rule.

It has been found that such model output data can be used to identify the relationship and causality effect between certain objects and the particular person, for example to identify in the above example the best way to extinguish a fire, and thus an appropriate action to be taken in a given situation. Such a determination may for example take into account an expected emotion of the person (such as fear, confidence, etc.), which could for example influence how the person reacts (for instance whether they would run away from a hazardous situation, or instead attempt to deal with the hazardous situation).

In one example implementation, the context and/or causality information that can be deduced through use of the personalised cognitive models by the behaviour tool may, in addition to providing an indication of the relationship between objects and the particular person, or as an alternative thereto, provide information relevant to person-to-person interactions. One particular example use case is in the understanding and modification of shifting relationships in real life. Purely by way of specific example, from social media or from recorded interactions the behaviour tool may be able to determine that the particular person has fallen out with someone else within his/her social circle, and such information could then be taken into account when the behaviour tool is undertaking certain tasks on behalf of the user, for example when setting up parties, seating plans, holidays, etc. When an iterative process is used to hone one or more of the personalised cognitive models over time (such iterative processes being discussed in more detail later), this would enable the behaviour tool to gain an even better understanding of an individual as more patterns are learned and trained. When anticipating latent needs, more and more subtle and very personalized cues which could mean different things in different individuals, such as dilated pupils, sweatier hands, elevated heart rates to predicate a potential match or mismatch of personal relationships before any conversation has happened, etc., could be considered by the behaviour tool, with the behaviour tool then suggesting actions accordingly.

Whilst, as discussed above, the information generated by the behaviour tool from one or more personalised cognitive models can be used to supplement other information that may be available to the behaviour tool, such information can instead, or in addition, be used in a more stand-alone manner by the behaviour tool. For example, in response to receipt by the behaviour tool of or more items of user data input by the particular person that are indicative of the given situation, the at least one of the one or more personalised cognitive models forming the digital twin may be triggered to generate model output data that is dependent on the one or more items of user data, with the earlier-mentioned decision circuitry then using at least the model output data when estimating the behaviour of the particular person.

Such an approach may provide a very powerful mechanism for assisting the particular person in their daily life. In particular, as the cognitive models are developed from digital memories that are generated based on actual events associated with that particular person, but a person does not necessarily have perfect recollection of all of their memories, use of the cognitive models may help to fill in the gaps in a person's recollection. Purely by way of specific example, if the particular person has lost their house keys, and is looking for them, a query to the behaviour tool may enable, via reference to the one or more personalised cognitive models forming the digital twin, a suggestion to be output from the behaviour tool as to where to look for those keys, based on previously generated digital memories. Hence, the estimated behaviour in this particular example can in effect be seen as a suggested behaviour when looking for that person's keys, and may enable the person to find the keys more quickly.

As another example of how the behaviour tool may be utilised to assist the particular person, when provided with at least one of the one or more personalised cognitive models forming the digital twin, the behaviour tool may be used to sift through large amounts of information in order to find items of interest to the particular person, or items that may require that person's attention, and to then generate prompts to that person. In particular, in one example implementation, the computer implemented method may further comprise obtaining input data from one or more sources indicative of multiple events, and employing filtering circuitry to reference the at least one of the one or more personalised cognitive models forming the digital twin based on the input data in order to perform a filtering operation to estimate a subset of the multiple events that are likely to be of interest to the particular person. Attention prompts could then be issued to the particular person indicative of a subset of the observed events. The filtering circuitry could take the form of a dedicated hardware circuit, or may take the form of general purpose processing circuitry operating under software control to perform the required filtering operations.

The inputs to the filtering circuitry can be received from many different and varied sources. For example, ambient sources within the environment in which the particular person is interacting may be used as a source of potentially useful information, with the filtering circuitry then filtering that information in order to determine any items of information that may be of interest. Purely by way of specific example, the filtering circuitry could for example receive input from a closed circuit television (CCTV) camera positioned around a corner from where the person is walking, note for example that there is a bicycle approaching the corner out of the person's sight, and generate an attention prompt to the person. As another example, information could be extracted from the Internet relating to a variety of different topics, for example weather, civil disruption, etc., with the behaviour tool filtering that information in order to identify items of interest, for example adverse weather or civil unrest in a region that the person is shortly planning to visit or in a region that is important to the person (for example his/her home town where family still reside), with an attention prompt being generated for the person accordingly.

Whilst in one example implementation the one or more personalised cognitive models may go through an initial training phase based on a set of digital memories, and thereafter be used "as is", in an alternative implementation those personalised cognitive models may be honed during use. In particular, in one example implementation the computer implemented method further comprises performing an iterative validation process to adjust the one or more personalised cognitive models so as to seek to improve accuracy of the estimated behaviour of the particular person generated by the behaviour tool. By performing such iterative validation, it is possible to obtain an augmented higher quality decision process when seeking to estimate the behaviour of the particular person.

The iterative validation process could be performed in a variety of different ways. For example, the iterative validation process may comprise obtaining behaviour influencing information from one or more sources, and then employing model maintenance circuitry to adjust the one or more personalised cognitive models in dependence on the behaviour influencing information.

The behaviour influencing information can come from a wide variety of different sources. For example, the behaviour influencing information may originate from the particular person, and/or from a trusted source of behaviour influencing information. The trusted source could take a variety of forms, for example, it could be a particular website on the Internet providing reliable information about certain events, or could be information from a relevant professional for a particular topic (for example advice from a fireman on how to deal with various fire scenarios, advice from a parent of the person, etc.).

With regards to input from the particular person itself, this can take many different forms. For instance, such input could be used to update certain preferences of that particular person, that may influence their future behaviour. By way of very specific example, the person may use the behaviour tool to organise a social gathering on his/her behalf, based on knowledge of the person's friends, their likes and dislikes, etc., and any update to information about the person's friends could then be taken into account when organising such a gathering in the future. As an example of a source of behaviour influencing information that may come from a trusted source, the model maintenance circuitry may receive input about global events, for example from the Internet, and could determine those events that may affect the person's behaviour (for instance, war or civil disruption in certain countries may affect the person's travel preferences, as indeed could significant weather events).

The above-mentioned model maintenance circuitry may be formed by a dedicated hardware circuit, or by a general purpose processing circuitry operating under suitable software control.

In one example implementation where the behaviour influencing information is provided by the particular person, then that behaviour influencing information may comprise update information provided by the particular person without solicitation from the behaviour tool, and/or feedback information provided by the particular person in response to one or more items of output information provided to the particular person from the behaviour tool. The use of such feedback information can be employed iteratively over time. For example, after adjustment of one or more of the personalised cognitive models has taken place based on one set of user feedback, further adjustments may take place over time based on further sets of user feedback.

As another example of how the iterative validation process may be performed, it could involve the evaluation of various test scenarios. For example, the iterative validation process may comprise, for a test situation, obtaining data from the particular person indicating a desired behaviour appropriate for the test situation, and employing the behaviour tool to use input data indicative of the test situation to trigger the at least one of the one or more personalised cognitive models forming the digital twin to generate the model output data. The model output data could then be used, optionally in combination with other information available to the behaviour tool, to determine an estimated behaviour of the particular person for the test situation. A comparison of the desired behaviour and the estimated behaviour can then be employed to generate feedback information used to adjust the one or more personalised cognitive models forming the digital twin. Such feedback and adjustment can enable an improvement in the quality of subsequent decisions made by the behaviour tool on the person's behalf.

There are various ways in which feedback information can be used to adjust the one or more personalised cognitive models forming the digital twin. For example, such feedback information may be used to adjust how the digital memories and the associations between the digital memories are analysed by a given personalised cognitive model forming the human digital twin. Such an approach may involve making adjustments to the given personalised cognitive model, which could for example affect how the digital memories, and their associations, are processed by that given personalised cognitive model. It could for instance alter which digital memories are considered more important than others, and hence result in an adjustment of the relative priorities of certain digital memories.

As another example of how the feedback information may be used, it could be used to adjust how one or more digital memories are determined from analysis of the multiple items of data associated with the corresponding events triggering the generation of the one or more digital memories. Hence, such feedback information may be used to alter how future digital memories are created, which in turn will adjust the given personalised cognitive models when those digital memories are subsequently processed by those models.

The one or more personalised cognitive models can take a variety of forms. For example, any given personalised cognitive model may be a machine learning derived model, a rules based model or a hybrid model derived from machine learning and rules based techniques.

As will be apparent from the earlier discussion, the one or more personalised cognitive models of the digital twin that are incorporated in the behaviour tool are generated from analysis of digital memories, and associations between those digital memories. The following discussion provides more detail as to the creation of those digital memories.

In order to create such digital memories, then in one example implementation an apparatus may be provided that employs a data store to store personal data derived from signals gathered from a plurality of sensors used to monitor a particular person (also referred to herein as the individual). The sensors can take a wide variety of different forms, and hence by way of example may comprise sensors provided within one or more of wearable devices, mobile devices used by the individual, Internet of Things (IoT) devices, a brain computer interface (BCI) device, etc., and more generally can take the form of any sensors that can be arranged to monitor the individual. The sensors can be dumb sensors or intelligent sensors. It will be appreciated that over time such a data store can gather together large amounts of personal data that provide a large number of small data items about the individual's life, transactions, emotions, interactions with the world and with machines, etc.

Further, the apparatus provides memories creation processing circuitry that is responsive to detection of a given event associated with the particular person, to perform an augmentation process during which the memories creation processing circuitry generates an augmented given event identifying multiple items of data associated with the given event. These multiple items of data include at least items of personal data associated with the given event that are obtained from the data store. In addition, the memories creation processing circuitry is then arranged to analyse the multiple items of data identified by the augmented given event in order to generate a given digital memory for the given event. Whilst the analysis performed by the memories creation processing circuitry may be performed in an effectively unsupervised manner in one example implementation, in another example implementation the memories creation processing circuitry operates in a supervised manner where the analysis performed by the memories creation processing circuitry is performed with reference to at least one given model. For this purpose, the memories creation processing circuitry can be provided with access to one or more models that can be used to create a digital memory from the multiple items of data identified by the augmented given event. Indeed, if desired, more than one model can be referenced during this process. By arranging the memories creation processing circuitry to refer to one or more particular models, the memories created can be aligned with the types of memories associated with those models, and hence the apparatus can be steered to generate memories of certain types that will be useful when performing subsequent analysis, for example when seeking to develop a high fidelity digital twin of the person from later analysis of the digital memories, as will be discussed in more detail later herein.

Each digital memory created by the memories creation processing circuitry for the particular person is stored within a memories data store. Hence, over time, the memories creation processing circuitry can generate a database of digital memories for the particular person. The apparatus further provides memories analysis circuitry to determine associations between the digital memories stored in the memories data store, and to maintain a record of those associations. Hence, the apparatus is able to both create a database of digital memories, and associations between those digital memories, and it has been found that through the generation of such data this can facilitate a generic and scalable mechanism for modelling the individual, supporting a wide variety of different use cases.

For example, based on the stored digital memories, and the determined associations between those memories, a high fidelity digital twin of the person can be developed that is able to infer human behaviour, emotion, etc., based on the generated digital memories and associations between those memories. This high fidelity digital twin can then evolve over time, as further digital memories and associations between memories are generated. By such an approach, a wide variety of different cognitive skills can be developed, which can then be used to assist the individual in various settings. Such cognitive skills could for example be used to assist a person in their day-to-day interactions with the world, could support a person who is mentally compromised in some way (for example due to suffering from a neurological disorder such as Alzheimer's disease) when seeking to undertake or relearn certain key skills, could be used to program a robot to act on the individual's behalf for certain activities, etc.

In one example implementation, the given model is arranged to identify relational representations between items of personal data, and the memories creation processing circuitry is arranged to use the relational representations in the given model to determine, with reference to the multiple items of data identified by the augmented given event, the given digital memory. Hence, by reference to the given model, the memories creation processing circuitry can determine how to interrelate the various pieces of data provided by the augmented event, and evaluate which items of data are more important, in the context of creating a digital memory for the given event.

The format of the digital memory can vary dependent on implementation, but in one example implementation each digital memory identifies a memory type and one or more items of personal data pertaining to the digital memory. The memory type can take a variety of forms, and could for example represent a type of emotion such as happy or sad, an inner quality like sensibility which is an indication of capacity for responding to emotions, a cognitive skill such as perception, judgement or executive functioning—which is a person's capability of planning, organising tasks, etc. Whilst in one example implementation the memory type could be determined by the memories creation processing circuitry from the data provided by the augmented event, in an alternative implementation the memory type may itself be one of the data items provided by the augmented event. For example, where one or more of the sensors allow for the generation of raw cognitive data (for example heartbeat, body temperature, pupil dilation, etc.) and have associated processing circuitry for generating processed cognitive data from that raw cognitive data, then the processed cognitive data provided within the augmented event may itself identify the memory type.

The memories creation processing circuitry can be arranged to operate in a variety of different ways. However, in one example implementation the memories creation processing circuitry may be arranged to apply one of a rules based analysis, a machine learning driven analysis, or a hybrid of a rules based analysis and a machine learning driven analysis in order to generate the given digital memory. In one example, the memories creation processing circuitry may leverage built-in ontologies in order to perform hyper contextualisation and association of heterogeneous data as provided in the augmented event.

The given model that may be used by the memories creation processing circuitry can take a variety of forms. In one example implementation, the given model may be subjected to a training phase prior to use by the memories creation processing circuitry to generate digital memories, wherein the training phase comprises obtaining input from the particular person in order to develop the given model to reflect the particular user's own knowledge.

As an alternative approach, or in addition, at least one model developed for use by the memories creation processing circuitry may be generated from analysis of the personal data generated for the individual. For example, the apparatus may further comprise model creation circuitry to perform an automated analysis of the personal data in the personal data store in order to develop a model for use by the memories creation processing circuitry. The automated analysis may involve the use of machine learning techniques such as deep learning in order to seek to identify patterns in the data, for example to learn correlations between events and actions in the example of an action/task model.

Further, in one example implementation the apparatus may comprise model update circuitry that can be used to refine a model used by the memories creation processing circuitry, based on the data identified by one or more augmented events that were used by the memories creation processing circuitry to generate associated digital memories. Hence, this provides a form of feedback loop, allowing one or more models to be refined over time to take account of how the data in the augmented events is being used in the creation of digital memories.

The given model that may be used by the memories creation processing circuitry can take a variety of forms, and indeed in some implementations the memories creation processing circuitry may have access to a variety of different models. In one example implementation, the given model may be one of a memories model, an emotion model, an inner quality model, a behavioural model or a cognitive skill model.

In one example implementation, the personal data in the personal data store is timestamped, and the memories creation processing circuitry is arranged, when performing the augmentation process, to seek to identify personal data within the personal data store that was generated at the same time as the given event. It will be appreciated that there can be some flexibility provided in relation to identifying data generated at the same time, and in some implementations a window of time around the time of the given event may be considered when identifying the personal data to be included within the augmented event, thereby including one or more items of personal data that were generated at approximately the same time as the given event.

Further, in one example implementation, the memories creation processing circuitry may be arranged, in response to a query trigger during the augmentation process, to query one or more of the plurality of sensors to obtain additional personal data for use in generating the augmented given event. Such an approach can for example be used to obtain real-time data used to augment the event, or to remove a possible ambiguity in respect of the event. The query trigger could take a variety of forms, but could for example be a trigger generated by the memories creation processing circuitry during the process of performing the augmentation process in order to obtain additional data, or the query trigger could be initiated as a direct result of detection of the event for which a digital memory is to be created, for example where that event is of a particular event type.

The memories analysis circuitry can be arranged to operate in a variety of ways, but in one example implementation is arranged to employ a graph database mechanism to determine and maintain the associations between digital memories. Any suitable graph database mechanism may be used for this purpose. If desired, the memories analysis circuitry may also use a rule-based, model-based or machine learning technique to determine the associations that need to be recorded.

There are various ways in which the memories creation processing circuitry may detect an event for which a digital memory should be generated. In one example implementation, the memories creation processing circuitry may be arranged to detect the given event due to one or more of:
- an event trigger resulting from new personal data received for storage in the personal data store;
- an event trigger resulting from analysis of the personal data in the personal data store performed by the memories creation processing circuitry;
- an event trigger defined by the particular person; and/or
- an event triggered by a sensor or associated device.

Hence, the adding of a new item of personal data into the personal data store, and/or an analysis of the personal data in the personal data store (for instance to detect one or more patterns in the data which are indicative of a situation where a new digital memory should be created) may be used as a trigger to generate a digital memory. Alternatively, or in addition, the individual may explicitly ask that a digital memory be created, either at a particular point in time or for a particular type of situation (as a specific example of this latter case, the individual may ask that a digital memory is created for every interaction with his/her mother). As another example, a sensor or associated device may determine from background analysis of the individual that an event has occurred for which a digital memory should be created. For example, augmented reality glasses could trigger an event based on something observed in an image, or a voice analysing sensor could (transparently to the individual) determine that a digital memory should be created based on something that the user has said (that is not itself a direct request from the individual to create a digital memory).

The personal data in the personal data store can take a variety of forms. For example, it may include data relating to external factors relevant to the environment with which the individual is interacting. However, in one example implementation, the personal data may alternatively, or in addition, comprise cognitive data representative of a behavioural state, a biological state, or a combination thereof, of the particular person. The cognitive data may be raw data obtained from one or more cognitive sensors, and/or may be processed cognitive data obtained from a behavioural processing unit based on analysis of the raw cognitive data. Examples of raw cognitive data may be heartbeat, body temperature, pupil dilation, etc., whilst an example of the processed cognitive data could be an emotion data such as happy, sad, fearful, etc.

Such a behavioural processing unit can take a variety of forms, and commonly owned co-pending patent publication WO 2019/175569 A1 discusses one suitable form of behavioural processing unit that may be employed. The behavioural processing unit could for example be arranged to use a machine learning technique trained for a certain type of inference, e.g. emotion, attention, planning, decision-making, reminding, etc., in order to generate the processed cognitive data.

In one example implementation, the apparatus further comprises digital twin creation circuitry to develop one or more cognitive skills via analysis of the digital memories stored in the memories data store and the record of the associations between the digital memories, to enable those one or more cognitive skills to be used to assist the particular person. As discussed earlier, by such an approach a high fidelity digital twin of the person can be developed that is able to infer human behaviour, emotion, etc., based on the generated digital memories and associations between those memories. The digital twin can then be used to replicate that behaviour, including for example emotion and decision-making. For instance, the digital twin may be used to associate actions/decisions to emotions in a given context, thus assisting in replicating the behaviour of the individual. This high fidelity digital twin can then evolve over time, as additional digital memories and associations between memories continue to be generated. As discussed earlier, the types of memories generated by the memories creation processing circuitry will be dependent on the model or models referred to by the memories creation processing circuitry when generating the memories. Accordingly, the model or models referred to by the memories creation processing circuitry in one example implementation can be chosen taking into account the cognitive skills that the digital twin creation circuitry will be used to develop based on analysis of the created digital memories, so as to seek to create digital memories that will support such subsequent cognitive skills development.

In one example implementation the digital twin creation circuitry may be arranged to perform a hierarchization process to seek to evaluate the relative importance of the stored digital memories having regard to the one or more cognitive skills being developed, and to maintain an indication of the relative importance of the stored digital memories. For example, by such an approach, the digital twin creation circuitry can be arranged to prioritise memories that relate to certain emotions. There are various ways in which the digital twin creation circuitry may perform such a hierarchization process. It could for example do this based on emotion strength indicated by data captured within individual digital memories, such as heartbeat, body language, or by the more recurringly re-used memories during the cognitive skills synthesis (for example based on the number of times a memory is re-used and/or associated with another memory).

In one example implementation the digital twin creation circuitry may be arranged to perform a cleaning process in respect of relatively low importance digital memories in order to free up storage space for the storage of new digital memories created by the memories creation processing circuitry. For example, a record could be maintained of how frequently certain digital memories are referenced, and memories that are infrequently referenced could be demoted in importance. The manner in which storage space is freed up could vary dependent on implementation. For example, old or unused digital memories could be deleted, or the accuracy of those memories could be reduced over time (for example by reducing the resolution of the information maintained for such old or less important memories).

The manner in which the digital twin creation circuitry is arranged to develop the desired cognitive skills may vary dependent on implementation. However, by way of example, in one implementation the digital twin creation circuitry may be arranged to perform a pattern analysis process to search for patterns in the stored digital memories and the associations between the digital memories, to seek to create knowledge and/or user models for the one or more cognitive skills. Machine learning techniques such as deep learning may be used as part of this process, and/or the process may be guided by the particular person in order to improve fidelity.

In one example implementation, the digital twin creation circuitry may be arranged to generate a feedback signal used to influence a given model used by the memories creation processing circuitry for generation of one or more subsequent digital memories. The way in which the given model is influenced can take a variety of forms. For example, such a feedback signal may be used to adjust a particular model, and/or to seek to identify which of a number of models is most appropriate to use in certain situations.

In one example implementation the apparatus may further comprise context handler circuitry to generate contextual information from the personal data in the data store, and the memories creation processing circuitry may be further arranged to incorporate that contextual information in the augmented given event. This can further improve the memory creation process by associating contextual information with the other data included in the augmented event.

The apparatus can take a variety of forms, but in one example implementation is configured as a confidential computing environment to protect the confidentiality of the particular person. Any suitable computing environments can be used for this purpose, for example those provided through use of the TrustZone and/or realm management extension (RME) products produced by Arm Limited, Cambridge, United Kingdom. If desired, authentication techniques can be employed at both the input and output sides of the apparatus, to make sure that the input data being provided within the augmented events relates to the particular person, thereby preventing the creation of false memories, and also to ensure that any output generated, for example from the earlier-discussed digital twin, is only used in association with the particular person. Any suitable access management technique for attestation (to ensure that the operating platform has not changed and is still trusted), and/or authentication (to make sure that the individual is in fact who he/she claims to be) could be used.

Particular and preferred examples of the techniques described herein will now be discussed with reference to the figures.

FIG. 1 is a block diagram of an apparatus 10 in accordance with one example implementation. The apparatus includes a data store 40 that is used to retain personal data obtained from a variety of different sensors that are used to monitor a particular person (also referred to herein as the individual) for whom it is desired to support the development of a digital twin. The sensors can take a wide variety of different forms, but can generally be considered to relate to different groups 20, 30.

For example, considering the group 20, there may be a plurality of sensors 22, 24, 26 that are used to gather data relating to external factors relevant to the environment with which the individual is interacting. This data could for example include an image representing what the individual is looking at (as for example obtained from a camera worn by the user (either as a dedicated camera or when incorporated within some other device such as augmented reality glasses) or external to the user that is tracking the individual's field of view), a temperature or other environment sensor to detect the environmental conditions around the individual, a GPS or other location sensor to identify the current location of the individual, a clock indication to identify date, and/or time of day, etc. This raw data could be provided "as is" for storing within the data store 40, or may be subject to some interpretation/aggregation function 28 to filter the data from the various sensors in order to determine what data to provide to the data store.

Such an interpretation/aggregation function 28 could be arranged to take into account how the data will be used by the apparatus 10, and hence for example take into account the various forms of digital memories that may be created by the apparatus in dependence on the data, and the forms of data that will be useful for that process. In addition, considering the group 30, there may be a plurality of sensors 32, 34, 36 that are used to gather cognitive data representative of a behavioural state, a biological state, or a combination thereof, of the particular person. Such sensors could take a variety of forms, but could for example detect a heartbeat, body temperature, pupil dilation, etc. Further, a brain computer interface (BCI) sensor could be used to obtain brainwave information. Such raw cognitive data could be provided "as is" for storing within the data store 40 or, as with the external factor data, may be subject to some interpretation/aggregation function 38 that can be arranged to filter the data from the various sensors in order to determine what data to provide to the data store, and could be arranged to take into account how the data will be used by the apparatus 10.

The interpretation/aggregation function 38 may involve the use of a behavioural processing unit 39 that can perform various interpretation and aggregation tasks. Such a behavioural processing unit 39 could for example be arranged to perform a machine learning process in order to produce processed cognitive data from the raw cognitive data, for instance if it has been trained for a certain type of inference, for example to detect emotion, attention, planning, decision-making, etc. based on combinations of raw cognitive data. It may also perform aggregation to fuse data and/or tag data produced by different sensors and to provide metadata from a mix of the data produced by such sensors. Any suitable behavioural processing unit may be used for this purpose, but an example of such a unit that could be used is described in commonly owned co-pending patent publication WO 2019/175569, the entire contents of which are hereby incorporated by reference.

As shown in FIG. 1, the apparatus 10 includes memories creation processing circuitry 45 (which may also be referred to herein as a memories creation processing engine) that is arranged, on detection of an event for which a digital memory should be created, to perform an augmentation process in order to generate an augmented event that includes multiple items of data associated with that event, those multiple items of data including various items of personal data retrieved from the data store 40 that are associated with that event. If desired, context handler circuitry 55 (also referred to herein as a context handler engine) may be arranged to generate contextual information from the personal data in the data store, and provide that contextual information to the memories creation processing circuitry 45 for inclusion as part of the data forming the augmented event. The memories creation processing circuitry 45 is then arranged to analyse the data provided by the augmented event (in one example implementation it does this with reference to one or more models stored in the models storage 50), in order to generate a digital memory for the event, which is then stored within the memories data store 60. The operation of the memories creation processing circuitry 45 will be described in more detail later with reference to FIG. 2.

As a result of the process described above, it will be appreciated that, over time, a database of digital memories for the individual will be established within the memories data store 60. Memories analysis circuitry 65 (which may also be referred to herein as a memories analysis engine) can be arranged to analyse the digital memories stored in the memories data store in order to determine associations between those memories, and then to maintain a record of those associations. This process will be discussed in more detail later with reference to FIG. 5A and FIG. 5B.

It has been found that through the creation of a database of digital memories, and associations between those digital memories, this can facilitate a generic and scalable mechanism for modelling the individual, supporting a wide variety of different use cases. In particular, as shown in FIG. 1, digital twin creation circuitry 70 (also referred to herein as a digital twin creation engine) can be arranged to analyse the digital memories and the record of associations between those digital memories in order to develop certain chosen cognitive skills, with those cognitive skills then being available to use in a wide variety of different ways to assist the individual. By such an approach, a high fidelity digital twin of the individual can be developed that is able to infer human behaviour, emotion, etc., and this high fidelity digital twin can then evolve over time as further digital memories and associations between the memories are generated. The operation of the digital twin creation circuitry 70 will be discussed in more detail later with reference to FIG. 6.

As example use cases of the cognitive skills developed by such a process, they may be used to assist the individual in their interactions with the world. Based on the knowledge provided by memories of past events, and the associations between those memories, such a process can make judgements about how the individual interacts with the world, thereby providing the ability to solve problems and act on behalf of the individual in certain circumstances, for example performing grocery shopping tasks, assisting in the playing of a video game, cooking, etc. Being able to perceive the world from the perspective of the individual and recall relevant memories will enable the digital twin to act efficiently on the individual's behalf, whether passively in the background, or when prompted by the individual (for example where the individual may wish to enter the passcode for a key lock and the digital twin can remind the individual of the number used for that lock). The digital twin may also be able to perform executive functioning tasks on behalf of the individual, such as planning, organisation, task initiation, time management, attention, evaluating priorities, problem solving, etc.

It may also be possible to train the digital twin on aspects of perception and judgement based on the analysis performed with respect to the digital memories and their associations. Perception is a cognitive process that allows people to take in information through their senses (sensation) and then utilise this information to respond and interact with the world. Perception may occur in multiple stages, for example stimulation, organisation, interpretation/evaluation, memory and recall. Such a process makes it possible for an individual to advance in their environment and interact with it. Such steps could be used as a subcomponent for a decision-making process, with the digital twin being able to undertake one or more of the steps on behalf of the individual.

The essence of cognition is judgement, which occurs when a certain object is distinguished from other objects and is characterised by some concept or concepts, allowing the individual to make decisions and judgements about things they have processed. Such a process may involve comparing new information with prior knowledge, and integrating this information into existing ideas or even replacing old knowledge with new knowledge. Such a process could for example enable the human digital twin to act on the individual's behalf in certain situations, for example when performing tasks with low consequentiality.

As schematically illustrated in FIG. 1, the digital twin (which can be viewed as comprising one or more personalised cognitive models generated by the digital twin creation circuitry 70), or a portion of that digital twin, may be output for incorporation within a behaviour tool 80, which may also be referred to herein as a behaviour engine. As mentioned earlier, the behaviour tool can take a variety of forms, but in one example implementation can take the form of a companion robot. The behaviour tool may exist as an entirely separate entity to the apparatus 10 discussed herein, or, as indicated by the dotted lines in FIG. 1, may be viewed as being part of the apparatus 10. Using model output data generated by one or more of the personalised cognitive models forming the digital twin, the behaviour tool can be arranged to estimate the behaviour of the particular person in certain scenarios, in order to provide assistance to that person.

The models provided within the models storage 50 can take a variety of forms. For example, one or more of the models may be subject to a training phase prior to its use by the memories creation processing circuitry 45, where the training phase comprises obtaining input from the individual in order to develop the model to reflect the particular user's own knowledge. However, if desired, model creation circuitry 75 (also referred to herein as a model creation engine) may also be provided to perform some automated analysis of the personal data in the personal data store 40 in order to develop one or more models for storage within the models storage 50, for subsequent access by the memories creation processing circuitry 45.

If desired, model update circuitry 75 (also referred to as a model update engine) may be employed to refine one or more of the models stored in the models storage 50 based on the data identified by augmented events used by the memories creation processing circuitry 45 to generate associated digital memories. This hence provides a feedback mechanism, allowing certain models to be refined over time to take account of how the data in the augmented events is being used in the creation of digital memories. The model update circuitry may be provided separately to the model creation circuitry, or (as per the example in FIG. 1) both the creation and update mechanisms could be implemented by the same circuitry/engine.

As also shown in FIG. 1, the model creation/update circuitry 75 may receive a feedback signal from the digital twin creation circuitry 70. Such a feedback signal may be used to influence the given model used by the memories creation processing circuitry 45 for the generation of one or more subsequent digital memories, for example by adjusting a particular model, and/or by seeking to identify which of a number of models is most appropriate to use in certain situations.

The apparatus 10 can take a variety of forms, but in one example implementation is configured as a confidential computing environment to protect the confidentiality of the particular person. As mentioned earlier, any suitable computing environments can be used for this purpose, and if desired authentication techniques can be employed at both the input and output sides of the apparatus, to make sure that the input data being provided within the augmented events relates to the particular person, thereby preventing the creation of false memories, and also to ensure that any output generated, for example from the earlier-discussed digital twin, is only used in association with the particular person.

In FIG. 1 distinct circuit blocks are illustrated in association with each of the above described functions performed by the apparatus 10. Whilst dedicated circuitry could be developed to implement each of these functions, it will be appreciated that in accordance with an alternative implementation those functions may be performed by software executing on one or more processing units of a general purpose computer.

Figure 2:
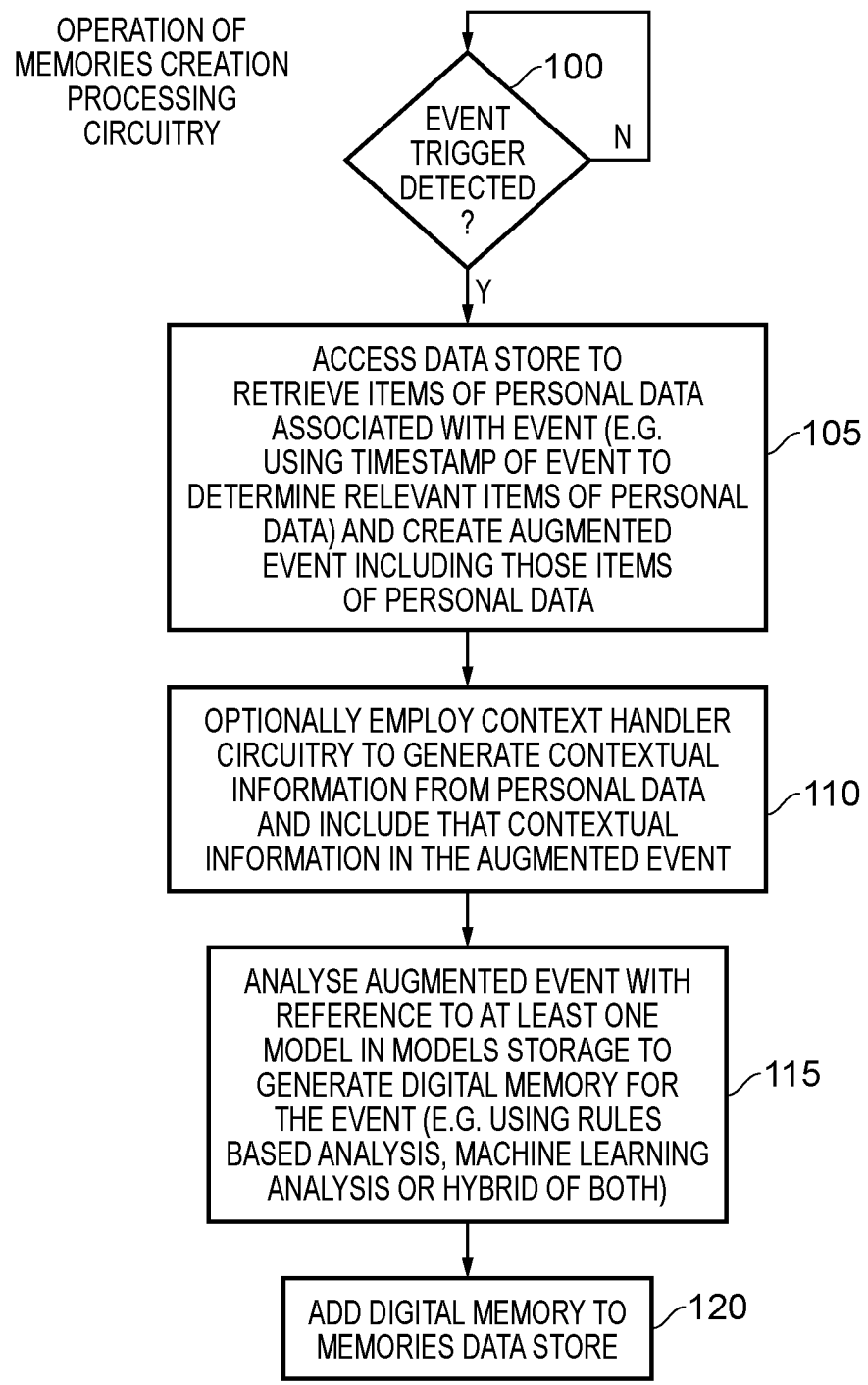
FIG. 2 is a flow diagram illustrating the operation of the memories creation processing circuitry/engine of FIG. 1 in accordance with one example implementation.

FIG. 2 is a flow diagram illustrating the operation of the memories creation processing circuitry 45 of FIG. 1, in accordance with one example implementation. At step 100, it is determined whether an event trigger has been detected. As discussed earlier, such an event trigger can take a variety of forms, and hence for example could occur on adding a new item of personal data into the personal data store 40, and/or based on an analysis of the personal data in the personal data store (for instance where that analysis identifies a pattern in the data that is indicative of a situation where a new digital memory should be created). Alternatively, or in addition, the individual may explicitly ask that a digital memory be created, or a sensor or associated device may determine from background analysis of the individual that an event has occurred for which a digital memory should be created.

Once an event trigger has been detected, then at step 105 the memories creation processing circuitry 45 can be arranged to access the data store 40 in order to retrieve items of personal data associated with the event. There are a number of ways in which this step can be performed. For example, assuming the various items of personal data stored in the data store have an associated timestamp, then based on a timestamp of the event it can then be determined which items in the personal data store are relevant to that event. The data retrieved from the data store can then be used to create an augmented event that includes various items of personal data retrieved from the data store 40.

If desired, during this process the memories creation processing circuitry 45 may also send a query to one or more sensors in order to obtain additional personal data for use in generating the augmented event. Such additional data may be used for a variety of purposes, for example to remove a possible ambiguity in respect of the event, or to obtain additional real-time data that is included within the augmented event.

As indicated by step 110, during the augmentation process, the context handler circuitry 55 may also be invoked to generate contextual information from one or more of the items of personal data within the data store 40, so that that contextual information can then be included in the augmented event. There are a number of known techniques for performing context analysis on data, and any suitable one of those techniques could be used to implement the function of the context handler circuitry 55. Purely by way of specific example as to the sort of functionality that the context handler circuitry could perform, it might determine from the personal data in the data store that the individual is leaving his/her house, and that based on the day of the week and the time, the user is leaving for work, and could then generate contextual information relevant to such an activity, for example by producing details relevant to the journey to work.

Once the augmented event has been generated, then at step 115 the memories creation processing circuitry 45 analyses that augmented event with reference to one or more of the models in the models storage 50. For instance, the chosen model or models may identify relational representations between various items of personal data, and those relational representations can be used to determine, with reference to the multiple items of data identified by the augmented event, the appropriate form of digital memory to generate. Hence, with reference to such a model or models, the memories creation processing circuitry can determine how to interrelate the various pieces of data provided by the augmented event, and evaluate which items of data are more important when creating a digital memory for the current event.

The model selected for use may depend on circumstances applicable to the event under consideration, for example the type of memory to be generated. For example, particular models may be appropriate to particular tasks. Sometimes it may be appropriate to refer to more than one model when generating a single digital memory, or indeed in some instances multiple different digital memories may be generated for the same event, for example by using a different model for each generated digital memory. These multiple different digital memories for the same event could then be filtered, and certain memories demoted or deleted, by the digital twin creation circuitry 70 in due course.

As shown in FIG. 2, once the digital memory has been generated, the process proceeds to step 120 where the digital memory is added to the memories data store 60 for future reference.

FIG. 3 schematically illustrates the format of a digital memory 150 that may be stored within the memories data store 60. The digital memory 150 comprises a number of fields, each field providing certain information. For example, a timestamp field 155 may be provided to identify a date and time associated with the digital memory. This can be useful when seeking to retrieve memories, or when making associations between memories. The timestamp may in some instances effectively provide a unique identifier for the digital memory, either by itself, or in combination with one or more of the other data fields within the digital memory.

As an example of another field that may be provided, a memory type field 160 may be provided to indicate the type of digital memory. The memory type can take a variety of forms, and could for example represent a type of emotion such as happy or sad, an inner quality like sensibility which is an indication of capacity for responding to emotions, a cognitive skill such as perception, judgement, or executive functioning —which is a person's capability of planning, and organising tasks, etc. As discussed earlier, the memory type could be determined by the memories creation processing circuitry 45 in some implementations, but alternatively may be provided as one of the items of data within the augmented event, for example where the earlier-discussed behavioural processing unit 39 is used to analyse raw cognitive data in order to generate processed cognitive data.

As indicated by the reference numeral 165, various other fields may be provided within the digital memory 150 to capture other relevant items of personal data that are used to define the digital memory. The items of data captured here will depend on the digital memory in question, but could for instance identify a variety of external factor data and/or cognitive data, for example a location, an image viewed by the individual at that location, any key persons or objects within that image, temperature or environmental information associated with the location, heartbeat information, body temperature information, etc. Still further examples of data that could be captured within the digital memory would be the person's attitude, for example whether positive or negative (which could be detected by a Behavioural Processing Unit (BPU) or by a biological signal from a suitable sensor), an indication of the person's social interaction, for example is he/she interacting with people (which could for example be inferred by identifying that the person is talking to someone who is looking at them/paying attention), who the person is that is being interacted with (for example is he/she a known family member, a work colleague or an unknown person), an indication of the key topic of discussion (for example Covid, sport, children, as may be inferred by natural language processing (NLP)), a type of interaction with objects, etc.

Figure 4A:
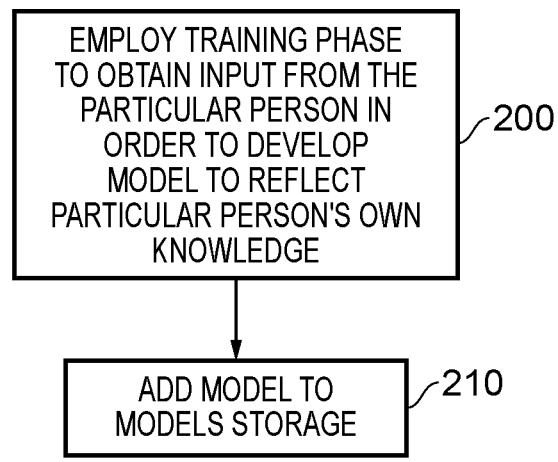
FIGS. 4A and 4B are flow diagrams illustrating techniques that may be employed in order to generate and maintain models for use when performing the techniques described herein, in accordance with example implementations.

FIG. 4A is a flow diagram illustrating one technique that may be used to develop a model for provision within the models storage 50 for future reference by the memories creation processing circuitry 45. In accordance with this example, at step 200, a training phase is employed in order to obtain input from the individual being modelled, in order to develop a model that reflects the particular person's own knowledge. Hence, in accordance with such an approach, the model is effectively developed off-line, and then at step 210 that model is added to the models storage 50, whereafter it can be referenced by the memories creation processing circuitry 45 when creating future digital memories.

Figure 4B:
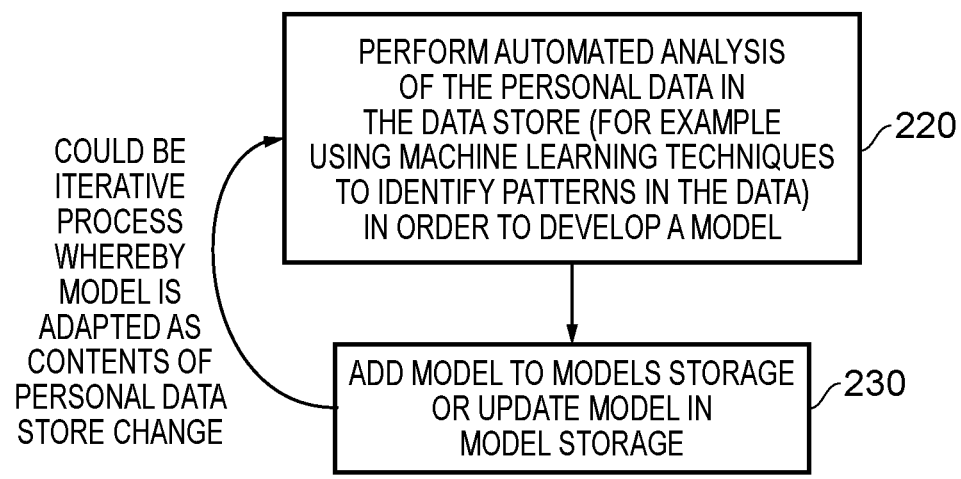

An alternative approach is shown by the flow diagram of FIG. 4B, where a model is developed in an automated manner with reference to the personal data stored in the data store 40. At step 220, an automated analysis of the personal data in the data store is performed using any suitable technique. For example, machine learning techniques may be used at this point to seek to identify patterns in the data, and then develop a model based on that analysis. As a particular example, such an approach may be used to seek to identify correlations between events and actions in the example of an action/task model.

At step 230, the model as developed at step 220 is added to the models storage 50 for subsequent use by the memories creation processing circuitry 45. As indicated in FIG. 4B, this process could be iterative, such that a model initially developed using such an automated analysis is then later adapted to take into account changes in the contents of the personal data store. This hence allows the model to adapt over time to take account, for example, of how the data in the augmented events is being used in the creation of digital memories. During such an iterative process, it will be appreciated that step 230 involves updating the model in the models storage 50 rather than storing a new model into the models storage.

Figure 4C:
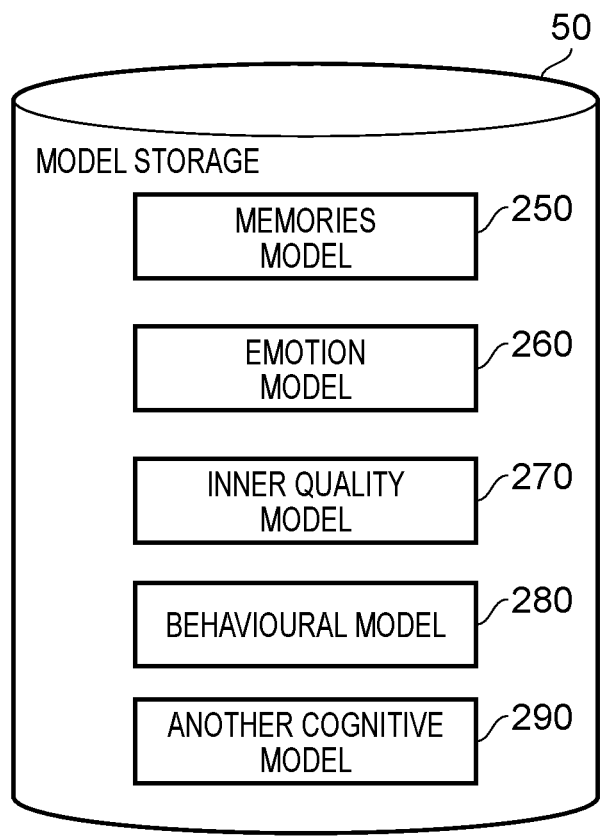
FIG. 4C schematically illustrates various different forms of models that may be used when employing techniques described herein.

There are a wide variety of different models that could be provided within the model storage 50 for reference by the memories creation processing circuitry 45. FIG. 4C schematically illustrates various different types of models that may be provided, in this example these including a memories model 250, an emotion model 260, and inner quality model 270, a behavioural model 280, and potentially one or more cognitive skill models 290.

As will be apparent to a person of ordinary skill in the art, such models can take a variety of forms. A memories model 250 aims to collect stimuli, for example smell, taste, etc., and to associate context with that stimuli that can then form memories that are triggered when that stimuli is presented in the future. For example, a memories model may be represented by the relation between a detected emotion and image-video of a gesture/posture, a sound, a location, a colour, a smell, a taste, etc. A specific example may be referred to as the Madeleine of Proust model, where when Madeleine drinks tea that taste triggers recollection of an event in time (for example his childhood) and a social interaction (for example with his aunt Leonie) and may also trigger other memories such as a place (for example his aunt's room in the village of Combray), and a mix of emotions (for example happiness, family love, tasting pleasure). A similar process can be used to develop an emotion model 260, where memories are associated with particular emotions, such as whether the person is happy, sad, fearful, etc.

As an example of an inner quality model 270, a sensibility model could be developed. A definition used to define such a model could be: the quality of being able to appreciate and respond to complex emotional or aesthetic influences. Such a model could have application in areas such as health and wellness. With such a form of inner quality model, the template could look for the following information:

1. Stimuli
    a. Social interaction:
        i. Is the person interacting with people? (inferred by "he/she is talking to someone looking at him/her or paying him/her attention"); who is it? (known—e.g. he/she is my family, a work colleague, . . . ; or unknown);
        ii. The topic: what is the person talking about? (Covid, sport, children, . . . for example inferred by NLP).
    b. Other type of interaction with the world.
2. The person's attitude: positive or negative; he/she thinks this is a good or bad thing to do/not to do (could be detected by the BPU or by a biological signal).
3. Emotion: the person's emotion type (detected by the BPU or other bio-signal).
4. Change in emotion: The person's reaction to the stimuli (e.g. reaction to someone crying/laughing, being hurt . . . ) with a score high/low on the reaction.

If such a model used, the memories analysis circuitry 65 could in due course search for similar memories when certain stimuli (e.g. $3^{rd}$ party emotion) generated a similar high reaction. Further, the digital twin creation circuitry 70 could in due course explore possible positive and negative reinforcement of past sensibility related experience. After a while this can establish a range of stimuli associated to a scale of sensibility (the person is highly sensitive to X, Y, Z, and not at all to . . . )

As an example of a behavioural model 280, a behavioural detection model could be used, where the template may look for the following information:
1. Environmental context: the area in which the event happened, e.g. school, work place, local shops and facilities, and local weather conditions (this could be inferred by geographical location and current conditions at this location—temperature/weather)
2. Social interaction:
   a. Is the person interacting with people? (inferred by "He/she is talking to someone looking at him/her or paying him/her attention"); who is it? (known—e.g. he/she is my family, a work colleague, . . . ; or unknown);
   b. The topic: what is he/she talking about? (Covid, sport, children, . . . for example inferred by NLP).
3. The person's attitude: positive or negative; he/she thinks this is a good or bad thing to do/not to do (could be detected by the BPU or by a biological signal).
4. Emotion: emotion type (for example detected by the BPU or by a biological signal).
5. Object interaction: type of object the person is touching (e.g. food, fork, squash shoes, coffee cup, house keys, . . . ), how is the person interacting with it (carefully, smashing it, throwing it, using it to interact with other objects and perform task—e.g. fork, knife, racket, . . . ) (may for example be inferred by computer vision in combination with machine learning based object detection). Such techniques may want a way to distinguish between the object the person is using and other objects in the scene, and this may be possible for example by using machine learning pre-screening techniques.
6. Type of activity: sport, work, leisure, relaxation, knowledge creation, driving, shopping, . . . unknown/new . . . .
7. Perception: it is difficult or easy to do; it is something the person knows how to do or not (thus the person has to be taught or to find a way to learn).
8. "stage of change model": contemplation, preparation, action, maintenance, termination (this may be part of a reinforcement learning stage, so could come in a second phase of development of the model).

If such a model used, the memories analysis circuitry 65 could in due course search for memories where the person has been observing and learning from others a similar task/activity/topic, and then link them together. Further, the digital twin creation circuitry 70 could in due course be used to explore possible positive and negative reinforcement of behavior. It could hence for example search for similar memories (determined by a similar score on each component), to try to identify a range of intention and a specific attitude which leads to similar behavior, for example the person is taking the stairs instead of the lift (behaviour), the person knows stairs enable him/her to do easily/regularly some sport so could make them healthier (attitude), the person wants to lead a healthier life (intention).

Considering an example of a cognitive model 290, one example would be a perception model. "Perception" is a cognitive process that allows people to take in information through their senses (sensation) and then utilize this information to respond and interact with the world. Perception occurs in five stages: stimulation, organization, interpretation-evaluation, memory and recall.

A perception detection model could be developed for storing within the model storage 50, where a template for such a model could look for the following information. In a first generation of such a model, perception could be simplified to the stimulation/organization stage, and thus the model may include:
   a. Environmental stimuli: visual, audio, etc., . . . leveraging machine learning classification (for example keyword spotting (KWS), natural language processing (NLP), Computer Vision image classification, etc.);
   b. Organization: for instance, this is known (e.g. this keyword or topic exists in the database, the task has been performed before—e.g. eating, biking) versus this is a new task (e.g. new keyword, new activity with new objects, for example first time the person is reacting to a car horn);
   c. Decision: what has the person decided to do "He/she used a bucket of water, to pour on fire"; he/she used the stairs, not the lift.

In a second generation of the model, interpretation-evaluation could be added, as could environmental context:
   d) interpretation-evaluation: this is easy or difficult to do (task was done in few seconds without effort versus it took a lot of time and the person was suffering/yelling/complaining/looking for help).
   e) Environmental context: for instance the area in which the event happened, for example school, work place, a specific event like a birthday, etc. (this could be inferred by geographical location).

If such a model used, the memories analysis circuitry 65 could in due course search for similar memories where stimuli generated a similar decision. Further, the digital twin creation circuitry 70 could in due course be used to explore possible positive and negative reinforcement of perception. Adding a causality dimension to the memory (which for example is possible if context is captured in the memories) can assist here. For example, it may be determined that smoke relates to fire or something burning. The action taken may depend on the context. For example, if the person smells smoke at home in the kitchen, the action may be to look for the cause (e.g. oven, toaster, etc.) and turn that device off, or in some instance to pour on water to a fire source. However, if at work, the action may be to evacuate the building. Hence, the context can provide an explanation as to why the same stimuli does not always create the same decision.

As another example of a cognitive model, an executive functioning model may be developed. Such a model could for example be useful in the areas of planning, organization, task initiation, time management, attention, evaluating priorities, problem solving, self-control, etc., which are essentially various types of life skills. Use of such a model may hence be beneficial when seeking to develop a personal assistant to act on a person's behalf, for example a robot to act on the person's behalf for certain organizational tasks.

In one example of such an executive functioning model, the template may look for the following information:
1. Environmental context: for instance, the area in which the event happened, for example school, work place, a specific event like a birthday, etc. (this could be inferred by geographical location).
1. Type of activity: sport, work, leisure, relaxation, knowledge creation, driving, shopping, . . . unknown/new . . . .

2. Social interaction:
   a. Keep only info about who the person interacts with (e.g. parents of a friend of the person's child, colleagues from the company where the person works), and when those interactions took place
   b. The topic: what is being discussed? (Covid, sport, children, . . . which could for example be inferred by NLP)
   c. Planning information: is the person proposing a specific activity (invitation for dinner, anniversary, work travel.)
   d. $3^{rd}$ party preferences—they like games, certain food, etc.
3. The person's attitude: positive or negative (could be detected by the BPU or by a biological signal)
4. Emotion: emotion type (detected by the BPU or by a biological signal)

Figure 5A:
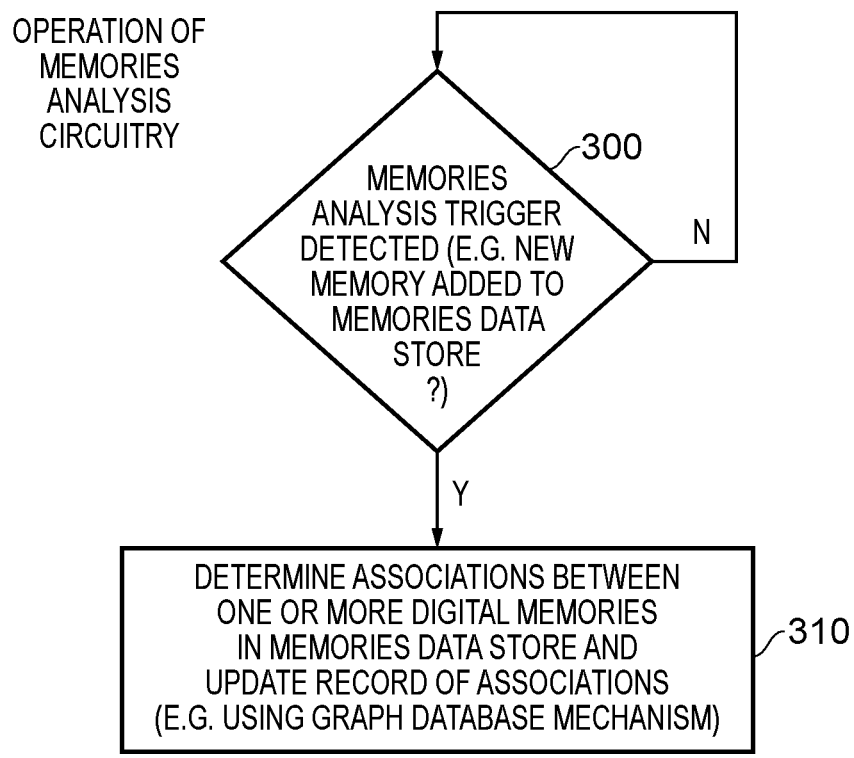
FIG. 5A is a flow diagram illustrating the operation of the memories analysis circuitry/engine of FIG. 1 in accordance with one example implementation, whilst FIG. 5B schematically illustrates how memories may be associated with each other by virtue of the technique employed by the memories analysis circuitry/engine.

If such a model used, the memories analysis circuitry 65 could in due course search for memories where the person has been planning something, and also create a graph for people (all memories relating to the persons work colleagues, etc.). Further, the digital twin creation circuitry 70 could in due course be used to pre-organize future events (e.g. dinner, birthday celebrations (for example organizing the person's son's $7^{th}$ birthday on the person's behalf—his friends are, they all love Harry Potter, this is June so weather should be good, we could do externally but it may be hot so we need drinks and a tent, . . . ). In such a scenario the digital twin creation engine may be able to propose options FIG. 5A is a flow diagram illustrating the operation of the memories analysis circuitry/engine 65 in accordance with one example implementation. At step 300, it is determined whether a memories analysis trigger has been detected. This can take a variety of forms, but a trigger could for example be detected each time a new digital memory is added to the memories data store 60. Alternatively, the trigger may occur at periodic intervals, in order to trigger the analysis of the memories stored within the memories data store 60.

Once such a memories analysis trigger has been detected, the process proceeds to step 310 where the memories analysis circuitry is arranged to analyse the digital memories in the memories data store in order to determine associations between those memories, and to then update a record of those associations maintained for the memories in the memories data store. This association information may be stored in a separate storage structure, or within the memories data store 60. In one example implementation, a graph database mechanism can be employed to determine and maintain the associations between digital memories. If desired, the memories analysis circuitry may also use a rule-based, model-based or machine learning technique to determine the associations that need to be stored.

It will be appreciated that the process employed at step 310 may not merely result in the creation of new associations for any new digital memories added to the memories data store 60 since the last time the analysis was performed by the memories analysis circuitry 65, but indeed the addition of such new digital memories may affect or alter one or more previously determined associations between pre-existing memories. Hence, the associations between the digital memories can evolve over time to take into account new digital memories added into the memories data store.

Figure 5B:
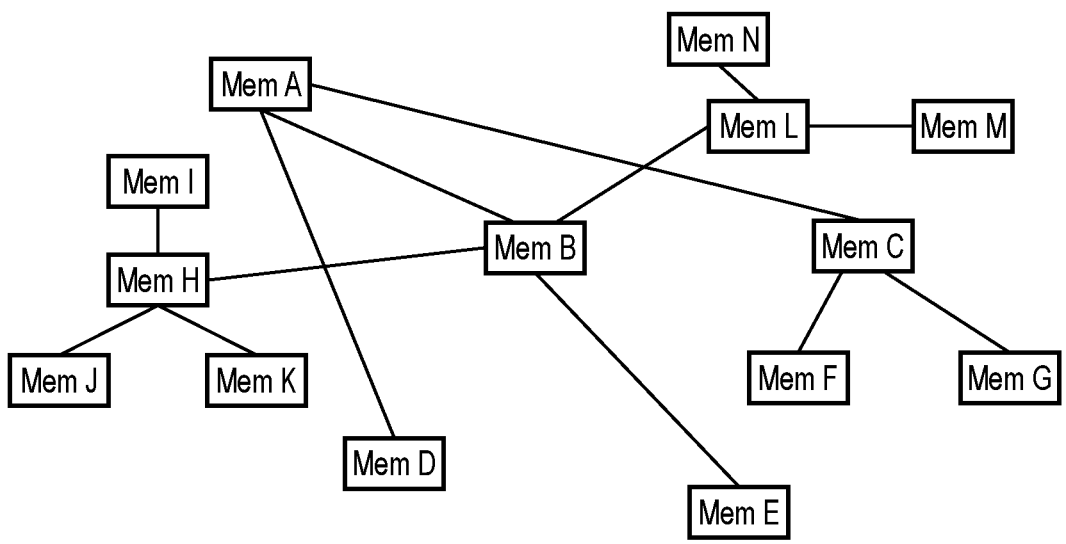

FIG. 5B is a diagram schematically illustrating how associations between individual digital memories may be maintained using a suitable graph database mechanism. As will be appreciated, a complex network of associations between memories can be captured. It will be appreciated that many types of associations may be detected and tracked, but purely by way of one simple example, the memories analysis circuitry may detect two or more happiness related memories that have occurred within a certain period of time, and then associate those memories with each other. This may for example identify that a particular day has been a good/pleasant day for the individual.

Figure 6:
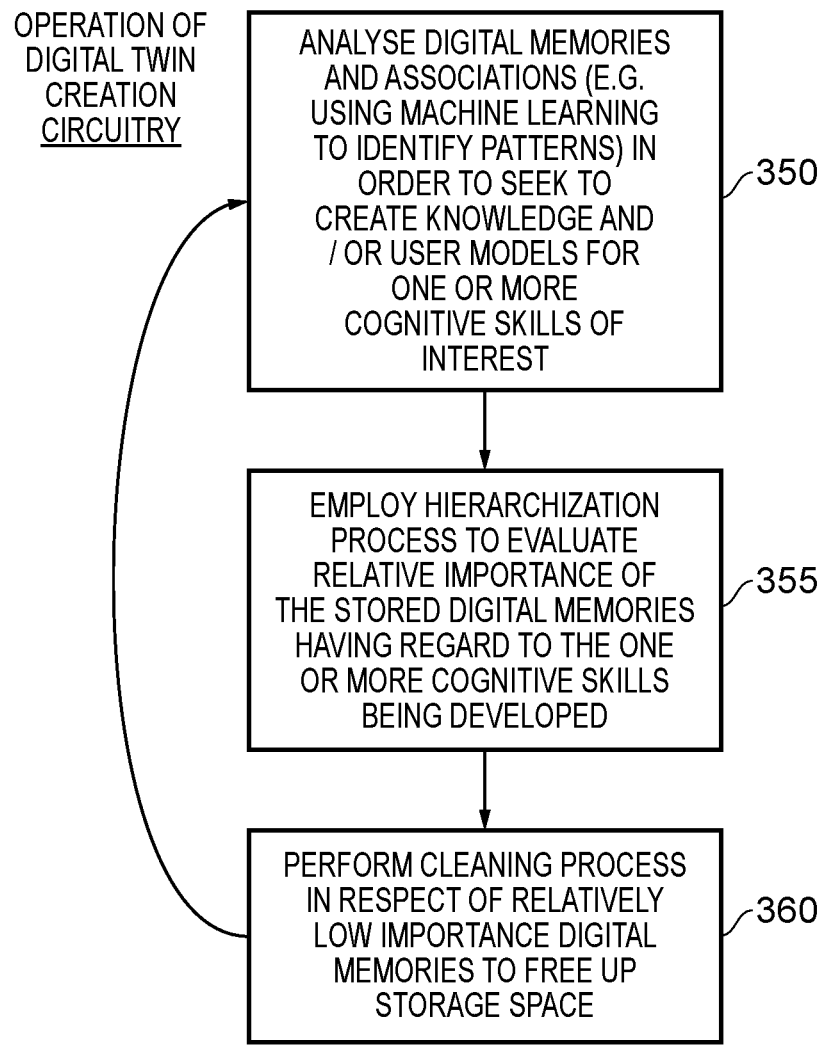
FIG. 6 is a flow diagram illustrating the operation of the digital twin creation circuitry/engine of FIG. 1 in accordance with one example implementation.

FIG. 6 is a flow diagram illustrating the operation of the digital twin creation circuitry/engine 70 in accordance with one example implementation. As indicated by step 350, the digital twin creation circuitry 70 can be used to analyse the digital memories in the memories data store 60 along with the associations between those memories determined by the memories analysis circuitry 65, in order to seek to create knowledge and/or user models for one or more cognitive skills of interest. In one example implementation, a machine learning technique may be employed to seek to identify patterns in the memories and associations, and based on those detected patterns create the knowledge and/or user models. By such an approach, a high fidelity digital twin of the individual can be developed that is able to infer human behaviour, emotion, etc., and hence can later be used to replicate that behaviour, or aspects of that behaviour. The high fidelity digital twin can then evolve over time, as additional digital memories and associations between memories continue to be generated.

As indicated by step 355, the digital twin creation circuitry can also employ a hierarchization process to seek to identify the relative importance of the memories stored within the memory data store 60 having regard to the one or more cognitive skills that are being developed. For example, memories associated with certain emotions could be prioritised. This process hence aims to replicate human behaviour, where certain memories are viewed as being more important than others, and are prioritised based on particular cognitive skills. There are various ways in which this process could be performed. In one example implementation, this may be based on an indication of emotion strength determined for example with reference to heartbeat data, body language, or by the more recurringly re-used memories during the cognitive skills synthesis (for example based on the number of times a memory is re-used and/or associated with another memory).

As indicated by step 360, the digital twin creation circuitry 70 may also perform a cleaning process in respect of relatively low importance digital memories in order to free up storage space. For example, memories that are infrequently referenced could be demoted in importance. If desired, old or unused digital memories could at some point be deleted, or the accuracy of those memories could be reduced over time by reducing the resolution of the information maintained for such memories.

As shown in FIG. 6, this process may be iterative, so that the digital twin evolves over time taking into account further digital memories and associations that are added to the memories data store, and taking into account any digital memories that have been demoted or deleted. Whilst steps 350, 355 and 360 have been shown sequentially for ease of illustration, it will be appreciated that in alternative implementation these steps may be performed in parallel, with each step being repeated at periodic intervals, or in response to associated triggers.

Figure 7:
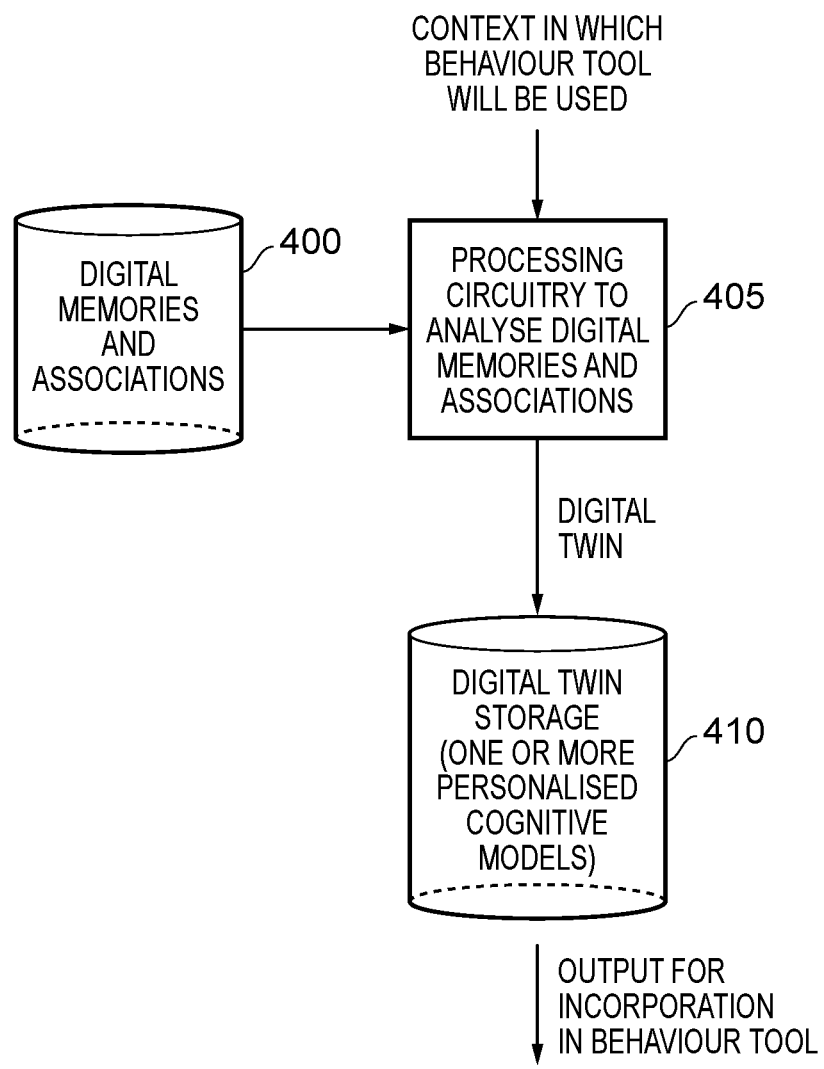
FIG. 7 is a diagram illustrating how digital memories and associations between those memories may be analysed in order to create a digital twin comprising one or more personalised cognitive models, in accordance with one example implementation.

FIG. 7 is a diagram illustrating how digital memories and associations between those memories may be analysed in order to create a digital twin comprising one or more personalised cognitive models, in accordance with one example implementation. The digital memories, and the associations between those memories, can be provided within storage 400, and input to processing circuitry 405 for analysis. The processing circuitry may be a dedicated hardware circuit, or may take the form of general purpose processing circuitry operating under software control. In one particular example implementation, the processing circuitry is provided by the digital twin creation circuitry 70 discussed earlier.

The processing circuitry is arranged to analyse the digital memories and their associations in order to seek to develop one or more personalised cognitive models used to form the digital twin. Various analysis techniques may be used here, but in one example implementation the processing circuitry performs a pattern analysis process to search for patterns in the stored digital memories and the associations between those digital memories. Machine learning techniques such as deep learning may in one example implementation be used as part of this process. As shown in FIG. 7, if desired, the processing circuitry may also receive an indication of a context in which the behaviour tool (that will in due course utilise the digital twin) will be used. By taking such context into account, this can influence for example the types of personalised cognitive models developed.

The one or more personalised cognitive models forming the digital twin are then stored within storage 410, from where they can be output for incorporation within the behaviour tool that will be used to estimate the behaviour of the particular person. Exactly which personalised cognitive models forming the digital twin are used within the behaviour tool may vary dependent on implementation. For example, every personalised cognitive model forming the digital twin could be output for incorporation within the behaviour tool, or alternatively only a subset of the personalised cognitive models may be output to the behaviour tool. Indeed, in some implementations the behaviour tool may decide which personalised cognitive models are required in any given situation, and retrieve the required cognitive models from the storage 410 as and when required.

Figure 8:
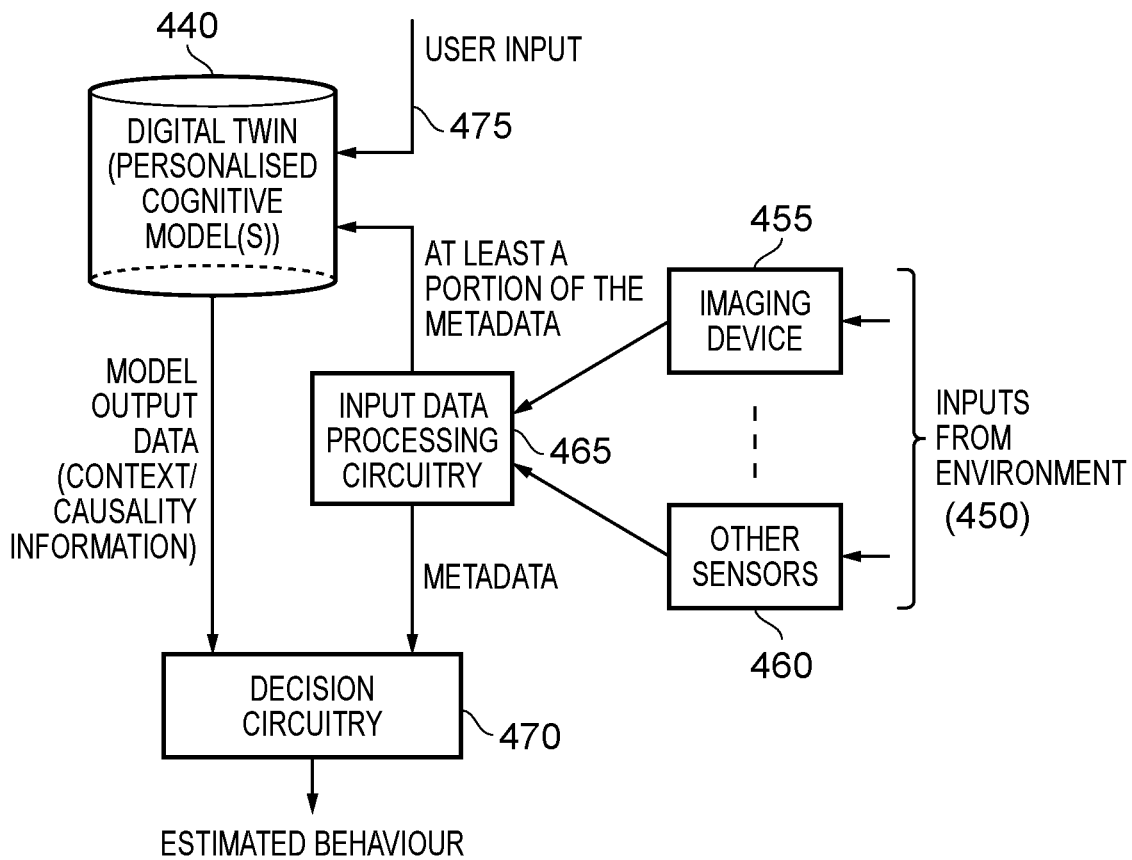
FIG. 8 is a block diagram illustrating components that may be provided within an apparatus in order to use one or more personalised cognitive models of the digital twin to generate information used to estimate the behaviour of a person, in accordance with one example implementation.

FIG. 8 illustrates an apparatus in accordance with one example implementation, where the information generated by the behaviour tool using one or more personalised cognitive models of the digital twin can be used to supplement other information that may be available to the behaviour tool. In this example, it is assumed that the behaviour tool is a companion robot having a plurality of sensors 455, 460 that provide input data 450 indicative of the environment in which the companion robot is operating. In this particular example, at least one of the sensors is an imaging device 455 providing a sequence of image data.

Input data processing circuitry 465 is arranged to process the input data provided from the variety of sensors 455, 460 in order to generate metadata that can be provided to decision circuitry 470. At least a portion of that metadata may also be used to trigger one or more personalised cognitive models of the digital twin 440 to generate model output data in dependence on that metadata. That model output data is also provided to the decision circuitry, such that the decision circuitry can then produce an estimation of the behaviour of the particular person in the current scenario based on both the metadata from the input data processing circuitry 465 and the model output data from the personalised cognitive models 440.

It has been found that the model output data can provide context information and/or causality information that can supplement the other information available to the behaviour tool, and in particular can provide information relating to unobservable factors that are not directly deducible by the input data processing circuitry 465 from the sensor input data. This can hence significantly improve the accuracy of the estimated behaviour that can be determined by the decision circuitry. By way of specific example, the input data processing circuitry 465 may be arranged to perform a scene graph generation operation based on the imaging data received from the imaging device 455, but the model output data may be able to augment the information available from such a scene graph generation operation, in particular producing information that cannot be deduced from the scene graph generation operation itself. For example, since the personalised cognitive models are developed based on digital memories created for the particular person, the model output data can capture relationship and causality effects between certain objects and the particular person that can be used to influence the behaviour estimated by the decision circuitry.

As also shown in FIG. 8, the apparatus may directly receive user input over path 475, with that user input being used to trigger the digital twin 440 to generate model output data that can then be used by the decision circuitry 470. By such an approach, the particular person could for example request assistance with a particular task, with the resultant estimated behaviour providing information that may assist the particular person completing that task.

The above-mentioned input data processing circuitry 465 and decision circuitry 470 may be dedicated hardware components, or may take the form of general purpose processing circuitry operating under software control to perform the required functions.

Figure 9:
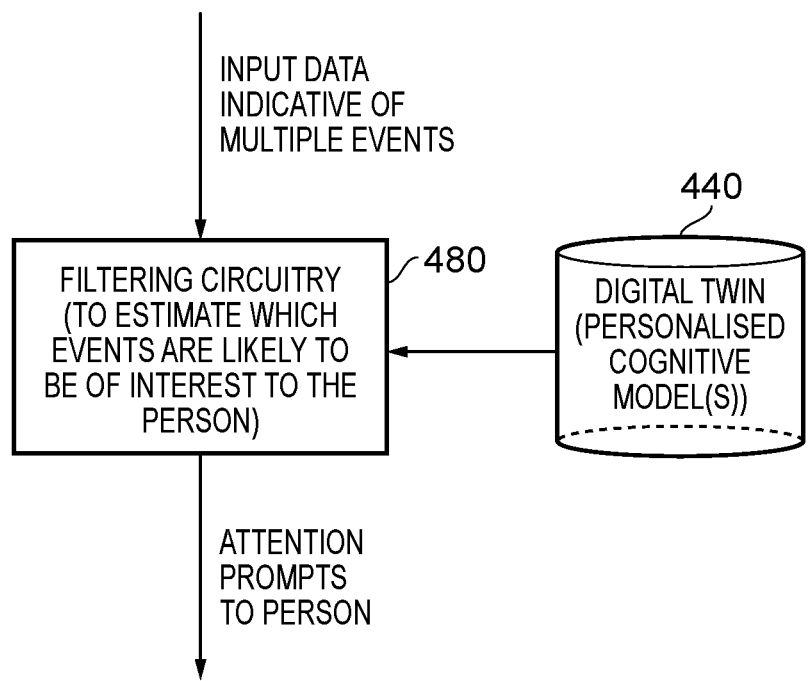
FIG. 9 is a diagram illustrating the use of filtering circuitry in one example implementation to generate attention prompts for a person.

FIG. 9 is a diagram schematically illustrating another way in which the behaviour tool may be utilised to assist the particular person. In this example, filtering circuitry 480 is provided (either as a dedicated hardware component within the behaviour tool, or by general purpose processing circuitry executing appropriate software) in order to receive input data indicative of multiple events. This input data can be received from many different and varied sources, such as sources located within the environment in which the particular person is interacting, or more general sources, such as websites on the Internet, etc.

With reference to the personalised cognitive models of the digital twin 440, the filtering circuitry 480 can sift through this potentially very large amount of data, seeking to identify items of information that are likely to be of interest or relevance to the particular person. When such items are found, attention prompts can then be output from the behaviour tool to the person for their review. By such an approach, the particular person can be kept up-to-date with information that may be of relevance to him/her, without having to manually review a large volume of information in order to seek to identify what is likely to be a relatively small subset of that information that is of interest.

Figure 10:
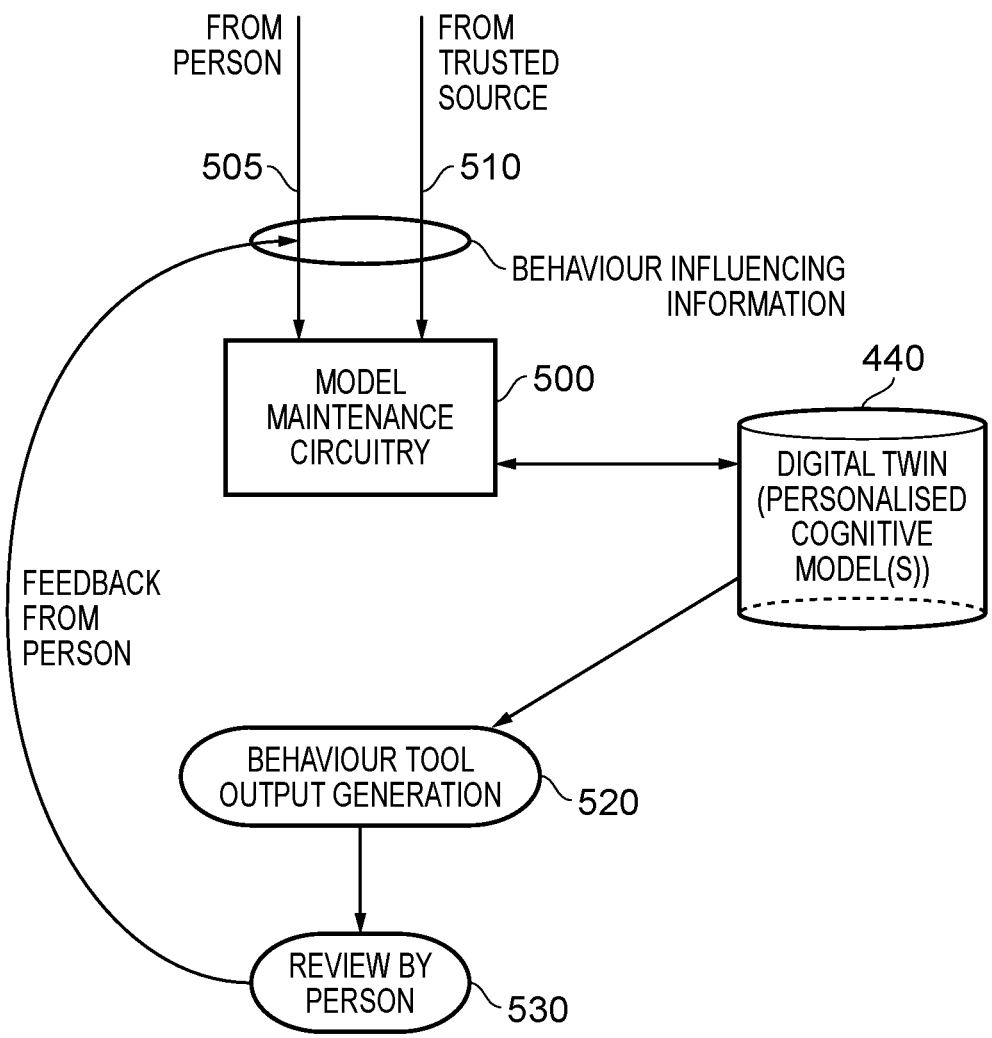
FIG. 10 is a diagram illustrating the use of model maintenance circuitry to update one or more of the personalised cognitive models forming the digital twin based on behaviour influencing information.

FIG. 10 is a diagram schematically illustrating how the one or more personalised cognitive models forming the digital twin 440 may be adjusted over time in order to seek to improve accuracy of the estimated behaviour of the particular person generated by the behaviour tool. As shown in FIG. 10, model maintenance circuitry 500 (which may take the form of a dedicated hardware component, or a general purpose processing circuit executing appropriate software) is arranged to receive behaviour influencing information from a variety of sources. For example, it may receive such information from the particular person over path 505, and/or may receive information from one or more trusted sources over path 510. The trusted sources could take a variety of forms, and by way of specific example may take the form of one or more trusted websites on the Internet that are considered to provide reliable information about certain events, or a relevant professional for a particular topic.

The model maintenance circuitry 500 is arranged to analyse the behaviour influencing information, and then adjust the one or more personalised cognitive models in dependence on that behaviour influencing information. Such adjustments may involve adjustments to one or more of the personalised cognitive models themselves, which could then for example affect how digital memories, and their associations, are processed by such models, and/or could also be used to adjust how future digital memories are created which in turn will alter the information used by the personalised cognitive models.

As schematically shown in FIG. 10, whilst input from the particular person may be unsolicited input, for example providing the model maintenance circuitry with information from the person about changes in their preferences, the input can also be provided as feedback from the person in response to output from the behaviour tool. Hence, as shown in FIG. 10 a behaviour tool output generation process 520 may generate output information with reference to the personalised cognitive models 440, with that output information then being subject to a review by the person (indicated by the bubble 530 in FIG. 10) in order to generate feedback provided as behaviour influencing information to the model maintenance circuitry 500. This process can be repeated iteratively over time so as to seek to adjust the personalised cognitive models and thereby enhance the accuracy of the behaviour tool.

Figure 11:
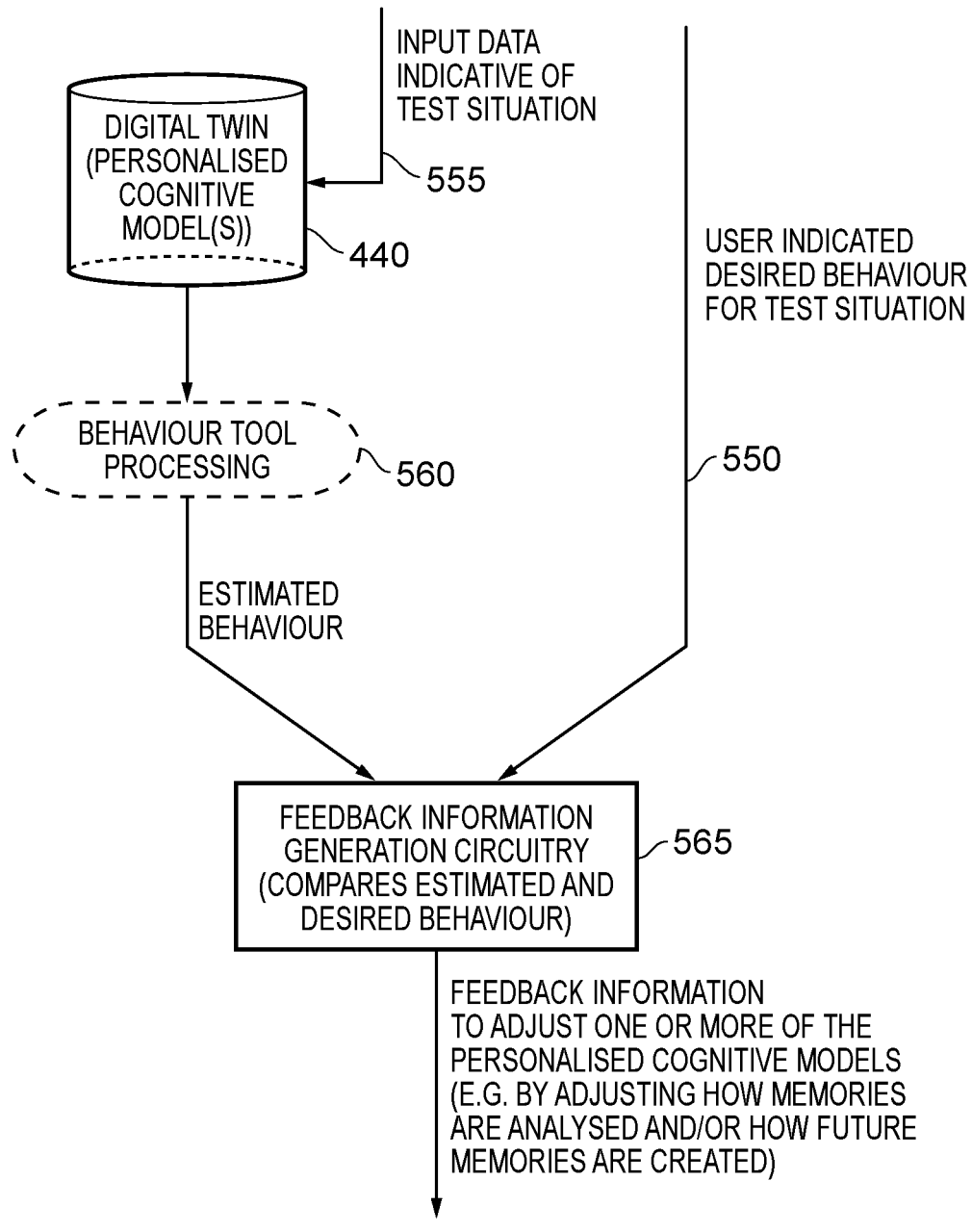
FIG. 11 illustrates how feedback information can be generated in one example implementation to adjust one or more of the personalised cognitive models.

FIG. 11 schematically illustrates another way in which feedback information can be generated in order to adjust one or more of the personalised cognitive models, in the example illustrated in FIG. 11 this involving the use of test situations. As shown in FIG. 11, the user may provide input over path 550 indicating a desired behaviour of the user for a particular test situation. In addition, input data indicative of that test situation may be input over path 555, for triggering one or more of the personalised cognitive models of the digital twin 440 to generate output data that can be subjected to behaviour tool processing 560. As a result of the behaviour tool processing 560, an estimated behaviour can be output from the behaviour tool, and feedback information generation circuitry 565 (which may be a dedicated processing circuit, or be provided by general purpose processing circuitry executing suitable software) can then compare the estimated behaviour with the desired behaviour indicated by the user over path 550, in order to generate feedback information. That feedback information may for example be provided to the earlier-discussed model maintenance circuitry 500, for use in adjusting one or more of the personalised cognitive models. This may involve for instance adjusting how the memories are analysed, for example by adjusting one or more of the models themselves, and/or influencing how future memories are created.

Figure 12:
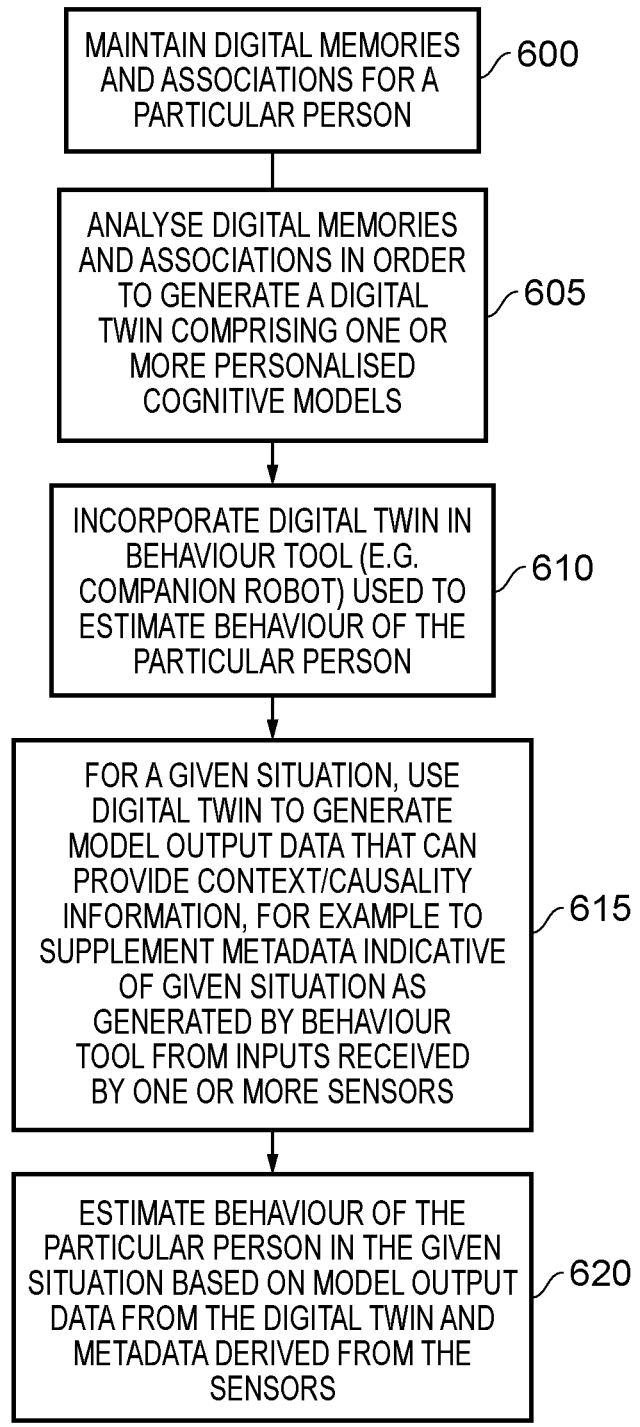
FIG. 12 is a flow diagram illustrating how digital memories created for a particular person, and associations between those memories, can be used to generate a digital twin which is then incorporated within a behaviour tool for use in estimating the behaviour of a particular person, in accordance with one example implementation.

FIG. 12 is a flow diagram illustrating steps performed in accordance with one example implementation. At step 600, digital memories, and associations between those memories, are maintained for a particular person. In one example implementation, this process may be performed using the components 45, 60, 65 discussed earlier with reference to FIG. 1. At step 605, the digital memories and associations between those memories are analysed in order to generate a digital twin comprising one or more personalised cognitive models. In one example implementation, this process may be performed by the digital twin creation circuitry 70 of FIG. 1 or the processing circuitry 405 of FIG. 7.

At step 610, the digital twin (or at least a subset of the personalised cognitive models forming the digital twin) are incorporated within a behaviour tool used to estimate behaviour of the particular person. The behaviour tool may take the form of the element 80 discussed earlier with reference to FIG. 1, and in one example implementation could be a companion robot. At step 615, the digital twin is then used, for a given situation, to generate model output data. In one example implementation, such model output data can provide context/causality information that can, for example, supplement metadata indicative of the given situation as generated by the behaviour tool from inputs received by one or more sensors. In other instances, the model output data may be used by itself, without reference to any additional metadata.

At step 620, the behaviour of the particular person in the given situation is then estimated by the behaviour tool, based at least on the model output data from the digital twin. Where metadata derived from sensors is also available, then as shown in FIG. 12 the estimated behaviour may be based on both the model output data and such metadata.

In accordance with the techniques described herein, a digital twin can be created from digital memories, and their associations, that comprises one or more personalised cognitive models, and all or some of those personalised cognitive models can then be incorporated within a behaviour tool. It has been found that such an approach provides a very efficient mechanism for training the behaviour tool, in a way that enables the behaviour tool to more reliably make an educated decision as to the expected behaviour of the person in various situations.

Other example arrangements set out in the following clauses:

1. A computer implemented method of developing a behaviour tool to estimate a behaviour of a particular person in response to a given situation, comprising:
   maintaining, in a storage device, digital memories and a record of associations between the digital memories, where a given digital memory is generated in response to a given event associated with the particular person and is determined from analysis of multiple items of data associated with the given event, including at least items of personal data derived from signals gathered from a plurality of sensors used to monitor the particular person;
   employing processing circuitry to analyse the digital memories and the record of associations between the digital memories, in order to generate a digital twin of the particular person comprising one or more personalised cognitive models, each personalised cognitive model being arranged to emulate an associated cognitive skill of the particular person; and
   outputting at least one of the one or more personalised cognitive models forming the digital twin for incorporation within the behaviour tool so as to cause the estimated behaviour of the particular person in response to the given situation to be influenced, at least in part, by model output data generated by the at least one of the one or more personalised cognitive models.

2. A computer implemented method as in Clause 1, wherein the processing circuitry performs a pattern analysis process to search for patterns in the stored digital memories and the associations between the digital memories, when developing the one or more personalised cognitive models used to form the digital twin.

3. A computer implemented as in Clause 1 or Clause 2, wherein the analysis performed by the processing circuitry when developing the one or more personalised cognitive models used to form the digital twin is arranged to take into account a context in which the behaviour tool will be used to estimate the behaviour of the particular person.

4. A computer implemented method as in any preceding clause, further comprising:
   receiving, from one or more sensors associated with the behaviour tool, input data indicative of an environment in which the behaviour tool is placed;
   employing input data processing circuitry to process the input data in order to generate metadata indicative of the given situation;
   inputting at least a portion of the metadata to the at least one of the one or more personalised cognitive models forming the digital twin in order to generate model output data; and
   employing decision circuitry to estimate the behaviour of the particular person in response to the given situation in dependence on both the metadata and the model output data.

5. A computer implemented method as in Clause 4, wherein:
   the one or more sensors comprise at least an imaging device to obtain one or more image signals of the environment in which the behaviour tool is placed, and the input data processing circuitry is arranged to perform a scene graph generation operation to analyse the one or more image signals in order to generate associated metadata indicative of the given situation; and
   the model output data used by the decision circuitry provides at least one of context information and causality information used to augment the metadata generated by the input data processing circuitry.

6. A computer implemented method as in any preceding clause, further comprising:
   in response to receipt by the behaviour tool of or more items of user data input by the particular person that are indicative of the given situation, triggering the at least one of the one or more personalised cognitive models forming the digital twin to generate model output data that is dependent on the one or more items of user data; and
   employing decision circuitry to use at least the model output data when estimating the behaviour of the particular person.

7. A computer implemented method as in any preceding clause, further comprising:
   obtaining input data from one or more sources indicative of multiple events;
   employing filtering circuitry to reference the at least one of the one or more personalised cognitive models forming the digital twin based on the input data in order to perform a filtering operation to estimate a subset of the multiple events that are likely to be of interest to the particular person; and
   generating attention prompts to the particular person indicative of the subset of the multiple events.

8. A computer implemented method as in any preceding clause, further comprising:
   performing an iterative validation process to adjust the one or more personalised cognitive models so as to seek to improve accuracy of the estimated behaviour of the particular person generated by the behaviour tool.

9. A computer implemented method as in Clause 8, wherein the iterative validation process comprises:
   obtaining behaviour influencing information from one or more sources; and
   employing model maintenance circuitry to adjust the one or more personalised cognitive models in dependence on the behaviour influencing information.

10. A computer implemented method as in Clause 9, wherein the behaviour influencing information originates from at least one of:
    the particular person;
    a trusted source of behaviour influencing information.

11. A computer implemented method as in Clause 9 or Clause 10, wherein the behaviour influencing information comprises at least one of:
    update information provided by the particular person without solicitation from the behaviour tool; and
    feedback information provided by the particular person in response to one or more items of output information provided to the particular person from the behaviour tool.

12. A computer implemented method as in any of clauses 8 to 11, wherein the iterative validation process comprises:
    for a test situation, obtaining data from the particular person indicating a desired behaviour appropriate for the test situation;
    employing the behaviour tool to use input data indicative of the test situation to trigger the at least one of the one or more personalised cognitive models forming the digital twin to generate the model output data;
    using at least the model output data to determine an estimated behaviour of the particular person for the test situation; and
    using a comparison of the desired behaviour and the estimated behaviour to generate feedback information used to adjust the one or more personalised cognitive models forming the digital twin.

13. A computer implemented method as in Clause 11 or Clause 12, wherein the feedback information is used to perform one or more of:
    adjusting how the digital memories and the associations between the digital memories are analysed by a given personalised cognitive model forming the human digital twin; and adjusting how one or more digital memories are determined from analysis of the multiple items of data associated with the corresponding events triggering the generation of the one or more digital memories.

14. A computer implemented method as in any preceding clause, wherein the one or more personalised cognitive models comprise one or more of:
    a machine learning derived model;
    a rules based model; and
    a hybrid model derived from machine learning and rules based techniques.

15. A computer implemented method as in any preceding clause, further comprising a digital memories creation process comprising:
    storing in a data store personal data derived from signals gathered from a plurality of sensors used to monitor the particular person;

responsive to detection of the given event associated with the particular person, employing memories creation processing circuitry:
  to perform an augmentation process to generate an augmented given event identifying multiple items of data associated with the given event, including at least items of personal data associated with the given event obtained from the data store; and
  to analyse the multiple items of data identified by the augmented given event in order to generate a given digital memory for the given event;
storing within the storage device digital memories generated by the memories creation processing circuitry for the particular person; and
determining associations between the digital memories stored in the storage device and maintaining the record of those associations in the storage device.

16. A computer implemented method as in any preceding clause, wherein the processing circuitry is arranged to perform a hierarchization process to seek to evaluate the relative importance of the stored digital memories having regard to one or more cognitive skills to be emulated by the digital twin and to maintain an indication of the relative importance of the stored digital memories.

17. A computer implemented method as in Clause 16, wherein the processing circuitry is arranged to perform a cleaning process in respect of relatively low importance digital memories in order to free up storage space for the storage of new digital memories.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A computer implemented method of developing a behaviour tool to estimate a behaviour of a particular person in response to a given situation, comprising:
  maintaining, in a storage device, digital memories and a record of associations between the digital memories, where a given digital memory is generated in response to a given event associated with the particular person and is determined from analysis of multiple items of data associated with the given event, including at least items of personal data derived from signals gathered from a plurality of sensors used to monitor the particular person;
  employing processing circuitry to analyse the digital memories and the record of associations between the digital memories, in order to generate a digital twin of the particular person comprising one or more personalised cognitive models, each personalised cognitive model being arranged to emulate an associated cognitive skill of the particular person; and
  outputting at least one of the one or more personalised cognitive models forming the digital twin for incorporation within the behaviour tool so as to cause the estimated behaviour of the particular person in response to the given situation to be influenced, at least in part, by model output data generated by the at least one of the one or more personalised cognitive models.

2. A computer implemented method as claimed in claim 1, wherein the processing circuitry performs a pattern analysis process to search for patterns in the stored digital memories and the associations between the digital memories, when developing the one or more personalised cognitive models used to form the digital twin.

3. A computer implemented as claimed in claim 1, wherein the analysis performed by the processing circuitry when developing the one or more personalised cognitive models used to form the digital twin is arranged to take into account a context in which the behaviour tool will be used to estimate the behaviour of the particular person.

4. A computer implemented method as claimed in claim 1, further comprising:
  receiving, from one or more sensors associated with the behaviour tool, input data indicative of an environment in which the behaviour tool is placed;
  employing input data processing circuitry to process the input data in order to generate metadata indicative of the given situation;
  inputting at least a portion of the metadata to the at least one of the one or more personalised cognitive models forming the digital twin in order to generate model output data; and
  employing decision circuitry to estimate the behaviour of the particular person in response to the given situation in dependence on both the metadata and the model output data.

5. A computer implemented method as claimed in claim 4, wherein:
  the one or more sensors comprise at least an imaging device to obtain one or more image signals of the environment in which the behaviour tool is placed, and the input data processing circuitry is arranged to perform a scene graph generation operation to analyse the one or more image signals in order to generate associated metadata indicative of the given situation; and
  the model output data used by the decision circuitry provides at least one of context information and causality information used to augment the metadata generated by the input data processing circuitry.

6. A computer implemented method as claimed in claim 1, further comprising:
  in response to receipt by the behaviour tool of or more items of user data input by the particular person that are indicative of the given situation, triggering the at least one of the one or more personalised cognitive models forming the digital twin to generate model output data that is dependent on the one or more items of user data; and
  employing decision circuitry to use at least the model output data when estimating the behaviour of the particular person.

7. A computer implemented method as claimed in claim 1, further comprising:
obtaining input data from one or more sources indicative of multiple events;
employing filtering circuitry to reference the at least one of the one or more personalised cognitive models forming the digital twin based on the input data in order to perform a filtering operation to estimate a subset of the multiple events that are likely to be of interest to the particular person; and
generating attention prompts to the particular person indicative of the subset of the multiple events.

8. A computer implemented method as claimed in claim 1, further comprising:
performing an iterative validation process to adjust the one or more personalised cognitive models so as to seek to improve accuracy of the estimated behaviour of the particular person generated by the behaviour tool.

9. A computer implemented method as claimed in claim 8, wherein the iterative validation process comprises:
obtaining behaviour influencing information from one or more sources; and
employing model maintenance circuitry to adjust the one or more personalised cognitive models in dependence on the behaviour influencing information.

10. A computer implemented method as claimed in claim 9, wherein the behaviour influencing information originates from at least one of:
the particular person;
a trusted source of behaviour influencing information.

11. A computer implemented method as claimed in claim 9, wherein the behaviour influencing information comprises at least one of:
update information provided by the particular person without solicitation from the behaviour tool; and
feedback information provided by the particular person in response to one or more items of output information provided to the particular person from the behaviour tool.

12. A computer implemented method as claimed in claim 8, wherein the iterative validation process comprises:
for a test situation, obtaining data from the particular person indicating a desired behaviour appropriate for the test situation;
employing the behaviour tool to use input data indicative of the test situation to trigger the at least one of the one or more personalised cognitive models forming the digital twin to generate the model output data;
using at least the model output data to determine an estimated behaviour of the particular person for the test situation; and
using a comparison of the desired behaviour and the estimated behaviour to generate feedback information used to adjust the one or more personalised cognitive models forming the digital twin.

13. A computer implemented method as claimed in claim 11, wherein the feedback information is used to perform one or more of:
adjusting how the digital memories and the associations between the digital memories are analysed by a given personalised cognitive model forming the human digital twin; and
adjusting how one or more digital memories are determined from analysis of the multiple items of data associated with the corresponding events triggering the generation of the one or more digital memories.

14. A computer implemented method as claimed in claim 1, wherein the one or more personalised cognitive models comprise one or more of:
a machine learning derived model;
a rules based model; and
a hybrid model derived from machine learning and rules based techniques.

15. A computer implemented method as claimed in claim 1, further comprising a digital memories creation process comprising:
storing in a data store personal data derived from signals gathered from a plurality of sensors used to monitor the particular person;
responsive to detection of the given event associated with the particular person, employing memories creation processing circuitry:
to perform an augmentation process to generate an augmented given event identifying multiple items of data associated with the given event, including at least items of personal data associated with the given event obtained from the data store; and
to analyse the multiple items of data identified by the augmented given event in order to generate a given digital memory for the given event;
storing within the storage device digital memories generated by the memories creation processing circuitry for the particular person; and
determining associations between the digital memories stored in the storage device and maintaining the record of those associations in the storage device.

16. A computer implemented method as claimed in claim 1, wherein the processing circuitry is arranged to perform a hierarchization process to seek to evaluate the relative importance of the stored digital memories having regard to one or more cognitive skills to be emulated by the digital twin and to maintain an indication of the relative importance of the stored digital memories.

17. A computer implemented method as claimed in claim 16, wherein the processing circuitry is arranged to perform a cleaning process in respect of relatively low importance digital memories in order to free up storage space for the storage of new digital memories.

18. A non-transitory computer-readable storage medium providing a computer program comprising program instructions which, when executed on a computer, cause the computer to implement the method of claim 1.

19. An apparatus comprising:
a storage device configured to store digital memories and a record of associations between the digital memories, where a given digital memory is generated in response to a given event associated with a particular person and is determined from analysis of multiple items of data associated with the given event, including at least items of personal data derived from signals gathered from a plurality of sensors used to monitor the particular person;
processing circuitry to analyse the digital memories and the record of associations between the digital memories, in order to generate a digital twin of the particular person comprising one or more personalised cognitive models, each personalised cognitive model being arranged to emulate an associated cognitive skill of the particular person; and
digital twin storage to store the generated digital twin, for provision of at least one of the one or more personalised cognitive models forming the digital twin to a behaviour tool used to estimate a behaviour of the particular person in response to a given situation, so as to cause the estimated behaviour of the particular person in response to the given situation to be influenced, at least in part, by model output data generated by the at least one of the one or more personalised cognitive models.

20. An apparatus providing a behaviour tool to estimate the behaviour of a particular person in response to a given situation, comprising:

storage to store at least one of one or more personalised cognitive models forming a digital twin of the particular person, each personalised cognitive model being arranged to emulate an associated cognitive skill of the particular person;

one or more sensors to generate input data indicative of an environment in which the behaviour tool is placed;

input data processing circuitry to process the input data in order to generate metadata indicative of the given situation, and to input at least a portion of the metadata to the at least one of the one or more personalised cognitive models forming the digital twin in order to generate model output data; and decision circuitry to estimate the behaviour of the particular person in response to the given situation in dependence on both the metadata and the model output data.

* * * * *